(12) United States Patent
Souma

(10) Patent No.: US 7,532,408 B2
(45) Date of Patent: May 12, 2009

(54) VARIABLE MAGNIFICATION OPTICAL SYSTEM AND IMAGE-TAKING APPARATUS

(75) Inventor: Yoshihito Souma, Sakai (JP)

(73) Assignee: Konica Minolta Opto, Inc., Hachioji-Shi (JP)

( * ) Notice: Subject to any disclaimer, the term of this patent is extended or adjusted under 35 U.S.C. 154(b) by 79 days.

(21) Appl. No.: 11/732,274

(22) Filed: Apr. 3, 2007

(65) Prior Publication Data

US 2007/0229971 A1    Oct. 4, 2007

(30) Foreign Application Priority Data

Apr. 3, 2006    (JP)    ............................. 2006-101404

(51) Int. Cl.
*G02B 15/14*    (2006.01)

(52) U.S. Cl. ...................... 359/676; 359/680; 359/686; 359/678

(58) Field of Classification Search ................ 359/676, 359/678, 680–682, 686
See application file for complete search history.

(56) References Cited

U.S. PATENT DOCUMENTS 4,759,617 A * 7/1988 Tokumaru et al. ........... 359/686

5,132,848 A * 7/1992 Nishio et al. ................ 359/686
2005/0259329 A1 * 11/2005 Yagyu et al. ................ 359/676

FOREIGN PATENT DOCUMENTS

JP    7-152002 A    6/1995
JP    11-174329 A    7/1999

* cited by examiner

*Primary Examiner*—Darryl J Collins
(74) *Attorney, Agent, or Firm*—Sidley Austin LLP

(57) ABSTRACT

A variable magnification optical system having at least a first lens group having a negative optical power, a second lens group having a positive optical power, a third lens group having a negative optical power, and a fourth lens element having a positive optical power, in the optical axis direction in zooming, keeps the third lens element immobile with respect to an image surface while moving at least the second lens group and the fourth lens group, whereby: an interval between the first lens group and the second lens group decreases, an interval between the second lens group and the third lens group increases, and an interval between the third lens group and the fourth lens group decreases. Moreover, the variable magnification optical system moves the third lens group in an in-surface direction vertical to the optical axis direction to thereby correct shake resulting from imaging on the image surface, and fulfills predetermined conditional formula.

17 Claims, 13 Drawing Sheets

EX1 FNo.=3.34 [W]

SPHERICAL ABERRATION  SINE CONDITION

EX1 Y'=4.5 [W]

ASTIGMATISM

EX1 Y'=4.5 [W]

DISTORTION

EX1 FNo.=4.15 [M]

SPHERICAL ABERRATION  SINE CONDITION

EX1 Y'=4.5 [M]

ASTIGMATISM

EX1 Y'=4.5 [M]

DISTORTION

EX1 FNo.=5.10 [T]

SPHERICAL ABERRATION  SINE CONDITION

EX1 Y'=4.5 [T]

ASTIGMATISM

EX1 Y'=4.5 [T]

DISTORTION

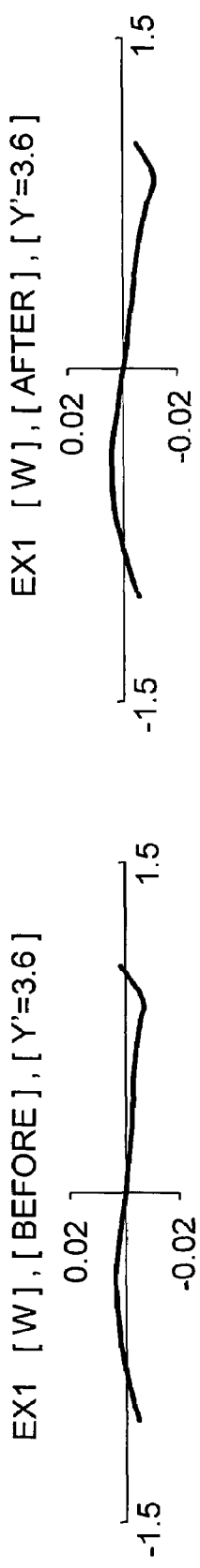
FIG.3A EX1 [W],[BEFORE],[Y'=3.6]
FIG.3B EX1 [W],[BEFORE],[Y'=0.0]
FIG.3C EX1 [W],[BEFORE],[Y'=-3.6]
FIG.3D EX1 [W],[AFTER],[Y'=3.6]
FIG.3E EX1 [W],[AFTER],[Y'=0.0]
FIG.3F EX1 [W],[AFTER],[Y'=-3.6]

EX1 [T],[AFTER],[Y'=3.6]

EX1 [T],[AFTER],[Y'=0.0]

EX1 [T],[AFTER],[Y'=-3.6]

EX1 [T],[BEFORE],[Y'=3.6]

EX1 [T],[BEFORE],[Y'=0.0]

EX1 [T],[BEFORE],[Y'=-3.6]

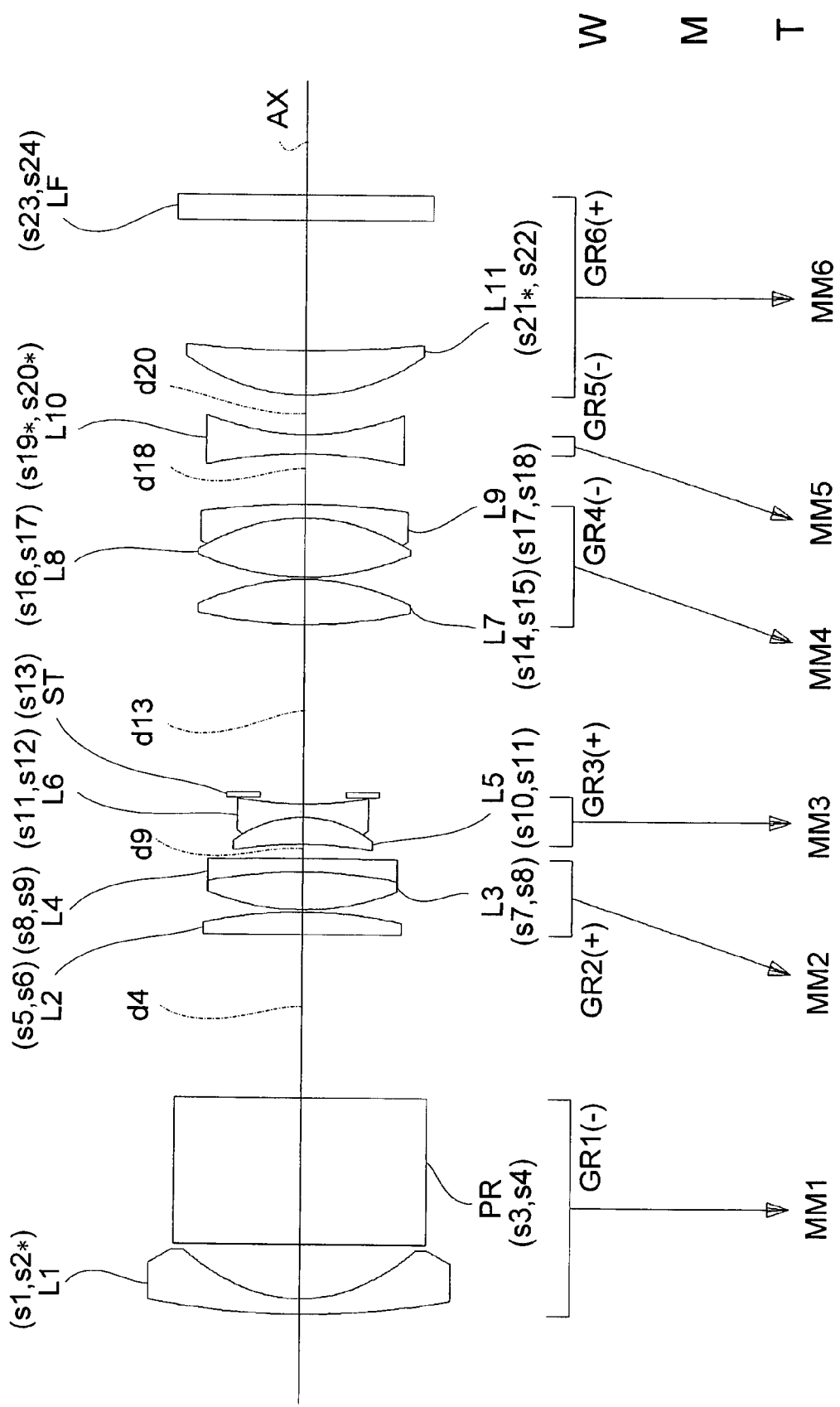

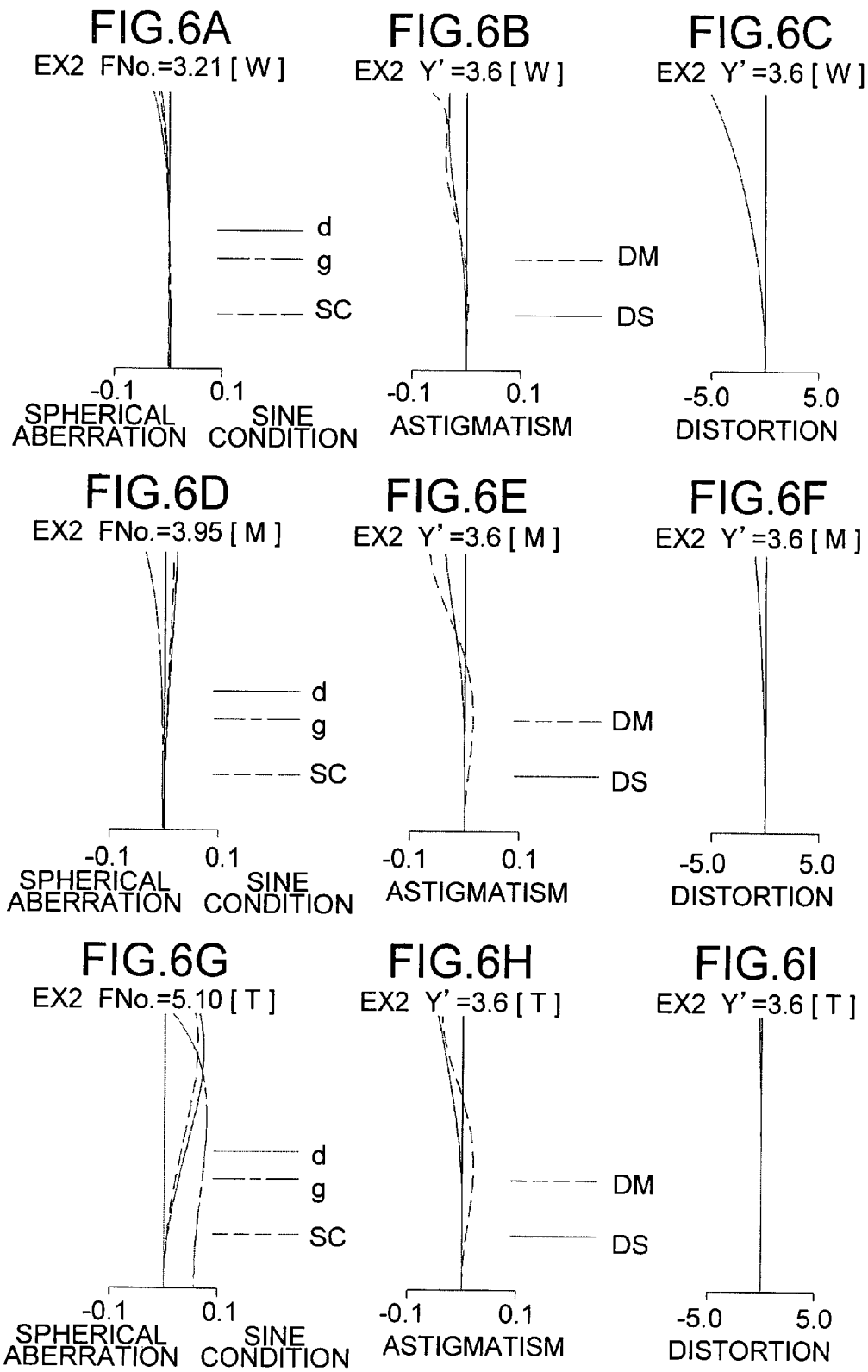

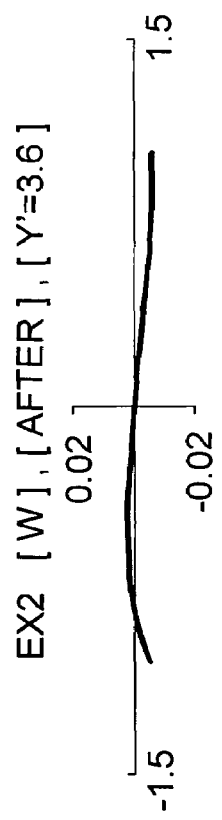
FIG.7A EX2 [W],[BEFORE],[Y'=3.6]
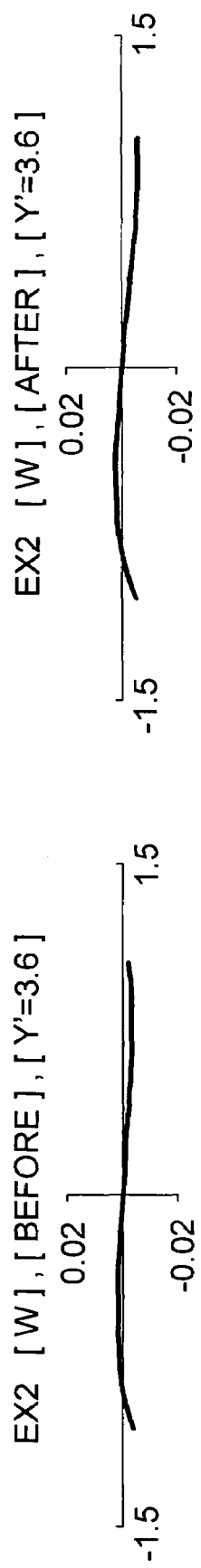
FIG.7D EX2 [W],[AFTER],[Y'=3.6]
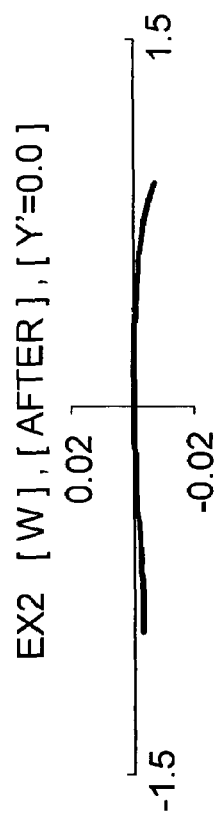
FIG.7B EX2 [W],[BEFORE],[Y'=0.0]
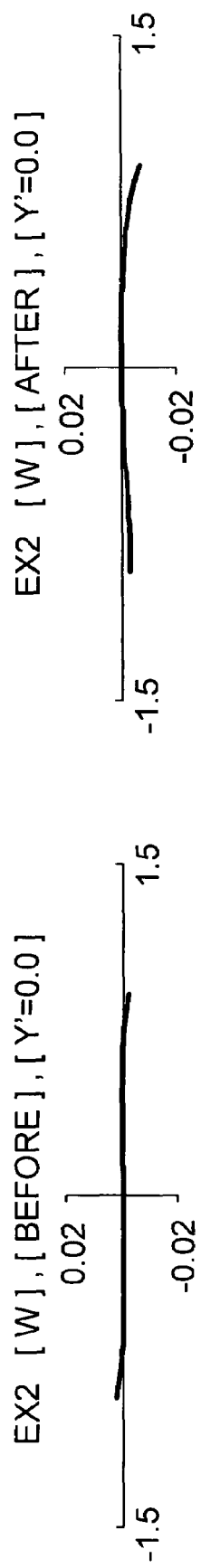
FIG.7E EX2 [W],[AFTER],[Y'=0.0]
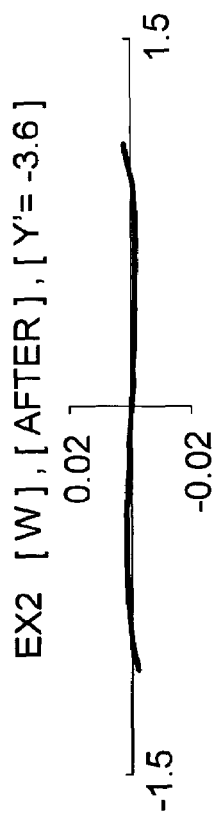
FIG.7C EX2 [W],[BEFORE],[Y'=-3.6]
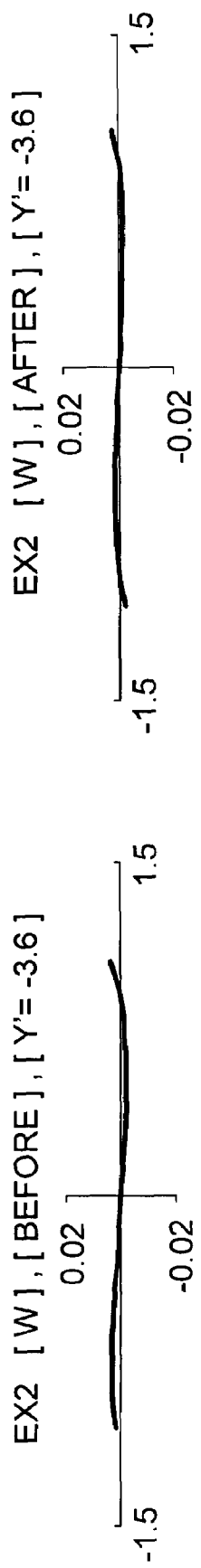
FIG.7F EX2 [W],[AFTER],[Y'=-3.6]

EX2 [T],[BEFORE],[Y'=3.6]

EX2 [T],[BEFORE],[Y'=0.0]

EX2 [T],[BEFORE],[Y'=-3.6]

EX2 [T],[AFTER],[Y'=3.6]

EX2 [T],[AFTER],[Y'=0.0]

EX2 [T],[AFTER],[Y'=-3.6]

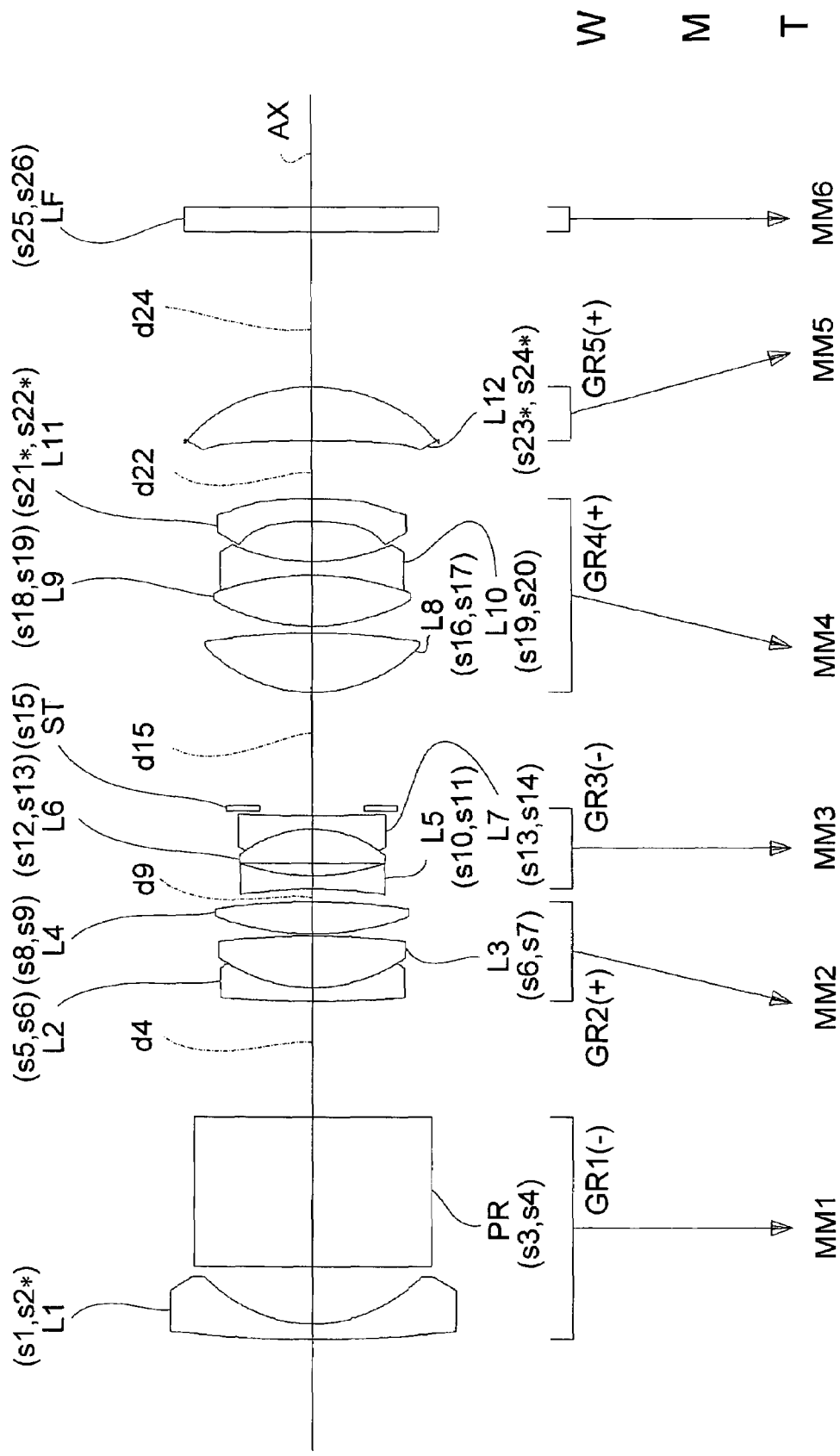

EX3 FNo.=3.18 [W]

SPHERICAL ABERRATION SINE CONDITION

EX3 Y'=4.5 [W]

ASTIGMATISM

EX3 Y'=4.5 [W]

DISTORTION

EX3 FNo.=4.03 [M]

SPHERICAL ABERRATION SINE CONDITION

EX3 Y'=4.5 [M]

ASTIGMATISM

EX3 Y'=4.5 [M]

DISTORTION

EX3 FNo.=5.48 [T]

SPHERICAL ABERRATION SINE CONDITION

EX3 Y'=4.5 [T]

ASTIGMATISM

EX3 Y'=4.5 [T]

DISTORTION

EX3 [T],[BEFORE],[Y'=3.6]

EX3 [T],[BEFORE],[Y'=0.0]

EX3 [T],[BEFORE],[Y'=-3.6]

EX3 [T],[AFTER],[Y'=3.6]

EX3 [T],[AFTER],[Y'=0.0]

EX3 [T],[AFTER],[Y'=-3.6]

VARIABLE MAGNIFICATION OPTICAL SYSTEM AND IMAGE-TAKING APPARATUS

This application is based on Japanese Patent Application No. 2006-101404 filed on Apr. 3, 2006, the contents of which are hereby incorporated by reference.

BACKGROUND OF THE INVENTION

1. Field of the Invention

The present invention relates to a variable magnification optical system which guides light from a photographing target (on the object side) to an image sensor, and an image-taking apparatus provided with such a variable magnification optical system. More specifically, the present invention relates to a variable magnification optical system provided with vibration-proof function and an image-taking apparatus provided with such a variable magnification optical system.

2. Description of the Related Arts

Conventionally, various interchangeable lenses for use in single-lens reflex cameras or the like have been developed. Moreover, various interchangeable lenses having vibration-proof function (so-called camera shake correction function) have been developed. One example of the interchangeable lenses having vibration-proof function is disclosed in, for example, patent documents 1 and 2.

Variable magnification optical system having the interchangeable lenses disclosed in these patent documents are arranged with optical power arrangement: "negative, positive, negative, and positive" from the object side to the image side. Such power arrangement is suitable for achieving a wider angle and a higher magnification, and also easily ensures back focus. Therefore, these variable magnification optical systems are preferable for use in single-lens reflex cameras and the like.

[Patent Document] JP-A-H7-152002

[Patent Document] JP-A-H11-174329

However, the variable magnification optical systems disclosed in patent documents 1 and 2 are not suitable for use in small-size digital cameras (so-called compact digital cameras), due to its insufficient aberration performance in compact digital cameras of a six-million-pixel class which have been recently distributed.

Usually, in zooming performed in a variable magnification optical system having "negative, positive, negative, and positive" optical powers for use in single-lens reflex, a first lens group moves by utilizing a cam ring or the like. However, it is preferable that, for compact cameras which often use an actuator or the like in zooming, the first lens-element be not moved.

SUMMARY OF THE INVENTION

The present invention has been made to solve the problem described above, and it is an object of the invention to provide a variable magnification optical system or the like provided with camera-shake correcting function and suitable for use in a small-size image-taking apparatus such as a compact camera or the like.

The invention refers to a variable magnification optical system having a plurality of lens groups for imaging light from an object side on an image surface of an image sensor. In this variable magnification optical system, the plurality of lens groups includes at least: in order from the object side to an image side, the first lens group having a negative optical power, the second lens group having a positive optical power, the third lens group having a negative optical power, and the fourth lens group having a positive optical power.

Moreover, this variable magnification optical system, in a case of magnification variation from a wide angle end to a telephoto end, in an optical axis direction, the third lens group is immobile with respect to the image surface, while at least the second lens group and the fourth lens group move, whereby: an interval between the first lens group and the second lens group decreases, an interval between the second lens group and the third lens group increases, an interval between the third lens group and the fourth lens group decreases, and on the other hand, the third lens group moves in an in-surface direction vertical to the optical axis direction to thereby correct shake resulting from imaging on the image surface.

Further, this variable magnification optical system fulfills conditional formula (1) below:

$$0.7 \leq f2/\sqrt{(fw \times ft)} \leq 1.3 \qquad \text{Conditional formula (1),}$$

where f2: denotes a focal length of the second lens group;

fw: denotes a focal length of the entire variable magnification optical system at the wide angle end; and ft: denotes a focal length of the entire variable magnification optical system at the telephoto end.

A variable magnification optical system according to the invention may have a plurality of lens groups including four lens groups: in order from an object side to an image side, the first lens group having a negative optical power, the second lens group having a positive optical power, the third lens group having a negative optical power, and the fourth lens group having a positive optical power. In a case of magnification variation from a wide angle end to a telephoto end, in an optical axis direction, the third lens group may be immobile with respect to the image surface, while at least the second lens group and the fourth lens group may move, whereby: an interval between the first lens group and the second lens group decreases, an interval between the second lens group and the third lens group increases, an interval between the third lens group and the fourth lens group decreases, and on the other hand, the third lens group may move in an in-surface direction vertical to the optical axis direction to thereby correct shake resulting from imaging on the image surface. Conditional formula (1) below may be fulfilled:

$$0.7 \leq f2/\sqrt{(fw \times ft)} \leq 1.3 \qquad \text{Conditional formula (1),}$$

where f2: denotes a focal length of the second lens group;

fw: denotes a focal length of the entire variable magnification optical system at the wide angle end; and ft: denotes a focal length of the entire variable magnification optical system at the telephoto end.

The above-mentioned objects as well as other objects and characteristics of the invention will be more clarified by the following description of the preferred embodiments and also by referring to the accompanying drawing.

DESCRIPTION OF THE DRAWINGS

FIG. 3A is a lateral aberration diagram at the wide angle end (W) in the variable magnification optical system of Example 1 before movement of a third lens group (where Y'=3.6);

FIG. 3B is a lateral aberration diagram at the wide angle end (W) in the variable magnification optical system of Example 1 before movement of the third lens group (where Y'=0.0);

FIG. 3C is a lateral aberration diagram at the wide angle end (W) in the variable magnification optical system of Example 1 before movement of the third lens group (where Y'=−3.6);

FIG. 3D is a lateral aberration diagram at the wide angle end (W) in the variable magnification optical system of Example 1 after movement of the third lens group (where Y'=3.6);

FIG. 3E is a lateral aberration diagram at the wide angle end (W) in the variable magnification optical system of Example 1 after movement of the third lens group (where Y'=0.0);

FIG. 3F is a lateral aberration diagram at the wide angle end (W) in the variable magnification optical system of Example 1 after movement of the third lens group (where Y'=−3.6);

FIG. 5 is a lens sectional view with a variable magnification optical system of Example 2 developed in a row;

FIG. 6A is an aberration diagram showing spherical aberration at the wide angle end (W) in zooming performed with the variable magnification optical system of Example 2;

FIG. 6B is an aberration diagram showing astigmatism at the wide angle end (W) in zooming performed with the variable magnification optical system of Example 2;

FIG. 6C is an aberration diagram showing distortion at the wide angle end (W) in zooming performed with the variable magnification optical system of Example 2;

FIG. 6D is an aberration diagram showing spherical aberration at the intermediate focal length position (M) in zooming performed with the variable magnification optical system of Example 2;

FIG. 6E is an aberration diagram showing astigmatism at the intermediate focal length position (M) in zooming performed with the variable magnification optical system of Example 2;

FIG. 6F is an aberration diagram showing distortion at the intermediate focal length position (M) in zooming performed with the variable magnification optical system of Example 2;

FIG. 6G is an aberration diagram showing spherical aberration at the telephoto end (T) in zooming performed with the variable magnification optical system of Example 2;

FIG. 6H is an aberration diagram showing astigmatism at the telephoto (T) end in zooming performed with the variable magnification optical system of Example 2;

FIG. 6I is an aberration diagram showing distortion at the telephoto end (T) in zooming performed with the variable magnification optical system of Example 2;

FIG. 7A is a lateral aberration diagram at the wide angle end (W) for the variable magnification optical system of Example 2 before movement of a third lens group (where Y'=3.6);

FIG. 7B is a lateral aberration diagram at the wide angle end (W) for the variable magnification optical system of Example 2 before movement of the third lens group (where Y'=0.0);

FIG. 7C is a lateral aberration diagram at the wide angle end (W) for the variable magnification optical system of Example 2 before movement of the third lens group (where Y'=−3.6);

FIG. 7D is a lateral aberration diagram at the wide angle end (W) for the variable magnification optical system of Example 2 after movement of the third lens group (where Y'=3.6);

FIG. 7E is a lateral aberration diagram at the wide angle end (W) for the variable magnification optical system of Example 2 after movement of the third lens group (where Y'=0.0);

FIG. 7F is a lateral aberration diagram at the wide angle end (W) for the variable magnification optical system of Example 2 after movement of the third lens group (where Y'=−3.6);

FIG. 9 is a lens sectional view with a variable magnification optical system of Example 3 developed in a row;

DETAILED DESCRIPTION OF THE PREFERRED EMBODIMENTS

First Embodiment

Hereinafter, one embodiments of the present invention will be described, with reference to the accompanying drawings.

[1. Digital Still Camera]

Figure 13:
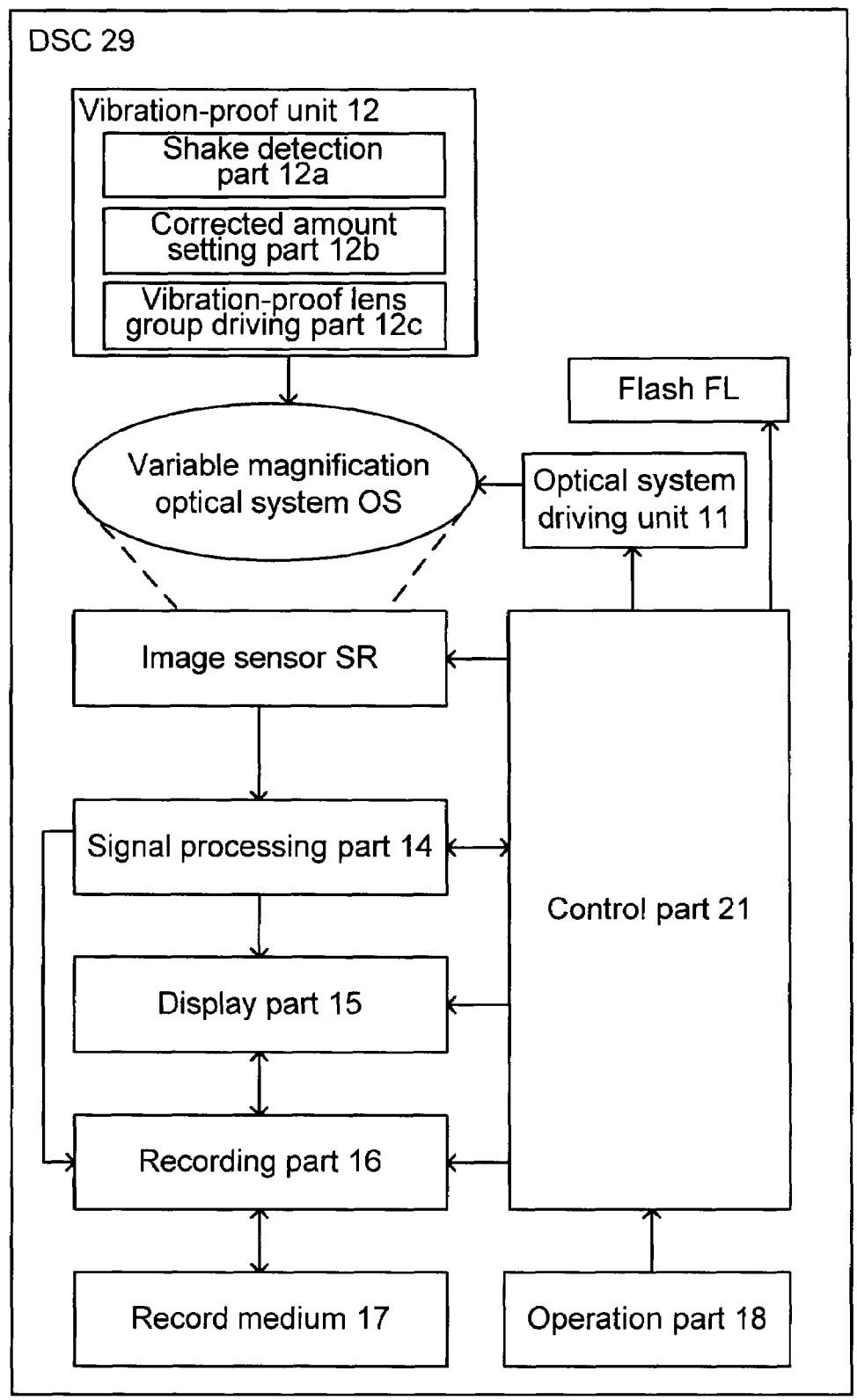
FIG. 13 is a block diagram showing configuration of a digital still camera.

FIG. 13 is a block diagram showing the inside of a digital still camera {DSC (image-taking apparatus)} 29 loaded with a variable magnification optical system OS.

The DSC 29 includes: as shown in FIG. 13, the variable magnification optical system OS, a flash FL, an optical system driving unit 11, a Vibration-proof unit 12, an image sensor SR, a signal processing part 14, a display part 15, a recording part 16, a recording medium 17, an operation part 18, and a control part 21.

The variable magnification optical system OS guides light from a photographing target (on the object side) to the image sensor SR, and also images this light on the light receiving surface (image surface) of the image sensor SR. Therefore, this variable magnification optical system OS may also be expressed as an imaging optical system or an image-taking optical system. Details of the variable magnification optical system OS will be described later.

The flash FL is a light source which irradiates a subject with rays of light to increase light from the subject (reflected light), thereby facilitating image sensing performed by the image sensor SR.

The optical system driving unit 11 has: several driving motors (optical system driving motors), and a transmission mechanism (optical system transmission mechanism) for transmitting driving force of the driving motors to lens groups included in the variable magnification optical system OS (both the driving motors and the transmission mechanism are not shown). The optical system driving unit 11 sets the focal length and the focal position of the variable magnification optical system OS by using the driving motors and the transmission mechanism. More specifically, the optical system driving unit 11, in accordance with instructions provided from the control part 21, sets the focal length and the focal position.

The Vibration-proof unit 12 includes: a shake detection part 12a, a corrected amount setting part 12b, and a vibration-proof lens group driving part 12c. The shake detection part 12a detects the inclination (shake) of the variable magnification optical system OS, and outputs the detection result (a shake signal) to the corrected amount calculation part 12b. The corrected amount setting part 12b, based on the inputted shake signal, sets the corrected amount required for Vibration-proof (camera shake correction). Then, the vibration-proof lens group driving part 12c, in accordance with the corrected amount, moves a lens group for Vibration-proof (vibration-proof lens group) defined in the variable magnification optical system OS by using the driving motor and the transmission mechanism (vibration-proof lens group driving motor and the vibration-proof lens group transmission mechanism), not shown.

The image sensor SR is, for example, an area sensor for a CCD (Charge Coupled Device), a CMOS (Complementary Metal Oxide Semiconductor) sensor, or the like, and receives rays of light which have passed through the variable magnification optical system OS and converts them to an electric signal (image sensing data). Then, the image sensor SR outputs this image sensing data to the signal processing part 14.

The signal processing part 14 processes electron data (image sensing data) from the image sensor SR to thereby generate sensed image data based on the image sensing data. This signal processing part 14, in accordance with instructions provided from of the control part 21, turns on or off processing operation. The signal processing part 14, in accordance with instructions provided from the control part 21, outputs the sensed image data to the display part 15 and the recording part 16.

The display part 15 includes, for example, a liquid crystal panel, and displays sensed image data and the like from the signal processing part 14, the status of use of the DSC 29, and the like.

The recording part 16, in accordance with instructions provided from the control part 21, records on the recording medium 17 the sensed image data generated by the signal processing part 14. The recording part 16, in accordance with instructions from the control part 21 provided in accordance with operation by the operation part 18 or the like, reads the sensed image data from the recording medium 17.

The recording medium 17 may be, for example, of a type which is incorporated inside the DSC 29, or a detachable memory card such as a flash memory or the like. That is, the recording medium 17 may be any medium on which sensed image data and the like can be recorded (optical disk, a semiconductor memory, or the like).

The operation part 18 outputs to the control part 21 various operation instructions provided by the user or the like, and may be composed of, for example, a shutter release button, an operation dial, and the like.

The control part 21 is a center portion which performs operation control and the like of the entire DSC 29, and organically controls driving of various members of the DSC 29 to thereby integrally control the operations.

[2. Variable Magnification Optical System]

[2-1. Variable Magnification Optical Systems of Examples 1 to 3]

Here, the variable magnification optical systems OS (Examples 1 to 3) will be described, with reference to the drawings.

The lens sectional views in the drawings (FIGS. 1, 5, and 9) show the variable magnification optical system OS developed in a row. In the drawings, symbol "GRi" denotes a lens group, and symbol "Li" denotes a lens element. Further, symbol "si" denotes a lens surface (transmission surface or the like). A number (i) provided to "GRi", "Li", and "si" denotes a position placed from the object side to the image side. An aspheric surface is suffixed with "*" (asterisk).

[2-1-1. Configuration of the Variable Magnification Optical System of Example 1 (see FIG. 1)]

The variable magnification optical system OS of Example 1 includes, in order from the object side to the image side, a first lens group GR1, a second lens group GR2, a third lens group GR3, a fourth lens group GR4, a the fifth lens group GR5, and a sixth lens group GR6.

[First Lens Group]

The first lens group GR1 has, in order from the object side, a first lens element L1 and an optical prism PR (optical axis changing element). This first lens group GR1 has a "negative (−)" overall optical power (refractive power), where the power is defined by a reciprocal of the focal length.

The first lens element L1 and the optical prism PR have characteristics as described below:

The first lens element L1: is a negative meniscus lens element convex on the object side (where s2* is an aspherical surface);

The optical prism PR: is a prism capable of bending rays of light from the object side at a right angle (for example, a rectangular prism), in which s3 is a surface where rays of light enters and s4 is a surface from which the rays of light exit.

The aspheric surface refers to a refractive optical surface of an aspheric shape, a surface having refracting function equivalent to that of an aspheric surface, or the like.

[Second Lens Group]

The second lens group GR2 includes, in order from the object side, a second lens element L2, a third lens element L3, and a fourth lens element L4. This second lens group GR2 has a "positive (+)" overall optical power.

The lens elements have characteristics as described below:

The second lens element L2: is a positive lens element convex on the both sides;

The third lens element L3: is a negative meniscus lens element convex on the object side; and The fourth lens element L4 is a positive lens element convex on the both sides.

The third lens element L3 and the fourth lens element L4 are cemented together on s8 to thereby form a cemented lens element. Adopted as a method of cementing them together is cementing by use of an adhesive or the like (similarly, adopted as a method of cementing to form a different cemented lens element to be described alter is also cementing by use of an adhesive or the like).

[Third Lens Group]

The third lens group (vibration-proof lens) GR3 includes a fifth lens element L5, a sixth lens element L6, a seventh lens element L7, and an optical aperture stop ST. This third lens group GR3 has a "negative" overall optical power.

The lens elements and the optical aperture stop ST have characteristics as described below:

The fifth lens element L5: is a lens element concave on the both sides;

The sixth lens element L6: is a positive meniscus lens element concave on the object side;

The seventh lens element L7: is a negative meniscus lens element concave on the object side; and The optical aperture stop ST: is an aperture stop which partially blocks rays of light which have passed through the first lens group GR1 and the second lens group GR2, and is also expressed as s15, and is integrated with the third lens group GR3.

The sixth lens element L6 and the seventh lens element L7 are cemented together on s13 to form a cemented lens element.

This third lens group GR3 is capable of moving by the vibration-proof lens unit 12 in a direction substantially orthogonal (vertical) to an optical axis AX (optical axis direction).

[Fourth Lens Group]

The fourth lens group GR4 includes an eighth lens element L8, a ninth lens element L9, and a tenth lens element L10. This fourth lens group GR4 has a "positive" overall optical power.

The lens elements have characteristics as described below:
The eighth lens element L8: is a positive lens element convex on the both sides (where s16* is an aspheric surface);
The ninth lens element L9: is a positive lens element convex on the both sides; and
The tenth lens element L10: is a negative meniscus lens element concave on the object side.

The ninth lens element L9 and the tenth lens element L10 are cemented together on s19 to form a cemented lens element.

[Fifth Lens Group]

The fifth lens group GR5 is formed with an eleventh lens element L11. This eleventh lens element L11 is a negative meniscus lens element convex on the object side. Thus, this fifth lens group GR5 (that is, the eleventh lens element L11) has a "negative" overall optical power. Both surfaces of the eleventh lens element L11 (s21* and s22*) are formed as aspheric surfaces.

[Sixth Lens Group]

The sixth lens group GR6 includes an twelfth lens element L12 and a low pass filter LF. This sixth lens group GR6 has a "positive" overall optical power.

The twelfth lens element L12 and the low pass filter LF have characteristics as described below:
The twelfth lens element L12: is a positive lens element convex on the both sides (where s23* is an aspheric surface); and
The low pass filter LF: is a filter formed with two surfaces (s25 and s26), and also an optical filter having a predetermined cutoff frequency characteristic determined by a pixel pitch of the image sensor SR.

[2-1-2. Configuration of the Variable Magnification Optical System of Example 2 (see FIG. 5)]

The variable magnification optical system OS of Example 2 includes, as in Example 1, in order from the object side to the image side, a first lens group GR1, a second lens group GR2, a third lens group GR3, a fourth lens group GR4, a fifth lens group GR5, and a sixth lens group GR6. The variable magnification optical system OS of Example 2, as in Example 1, has optical power arrangement "negative, positive, negative, positive, negative, and positive".

[First Lens Group]

The first lens group GR1 includes: in order from the object side, a first lens element L1 and an optical prism PR. The first lens element L1 and the optical prism PR have characteristics as described below:
The first lens L1: is a negative meniscus lens convex on the object side (where s2* is an aspherical surface); and
The optical prism PR: is, as in Example 1, a prism capable of bending rays of light from the object side at a right angle, in which s3 is a surface where rays of light enter and the surface s4 is a surface from which the rays of light exit.

[Second Lens Group]

The second lens group GR2 includes: in order from the object side, a second lens element L2, a third lens element L3, and a fourth lens element L4. The lenses have characteristics as described below:
The second lens element L2: is a plano-convex lens element having a flat surface on the object side;
The third lens element L3: is a positive lens element convex on the both sides; and
The fourth lens element L4: is a negative meniscus lens element concave on the object side.

The third lens L3 and the fourth lens element L4 are cemented together on s8 to form a cemented lens element.

[Third Lens Group]

The third lens group (vibration-proof lens) GR3 includes a fifth lens element L5, a sixth lens element L6, and an optical aperture stop ST. The lens elements and the optical aperture stop ST have characteristics as described below:
The fifth lens L5: is a positive meniscus lens element concave on the object side:
The sixth lens element L6: is a negative lens element concave on the both sides; and
The optical aperture stop ST: is, as in Example 1, an aperture stop which partially blocks rays of light which have passed through the first lens group GR1 and the second lens group GR2, and is integrated with the third lens group GR3. Note that the optical aperture stop ST is also expressed as S13.

The fifth lens element L5 and the sixth lens element L6 are cemented together on s11 to form a cemented lens element.

This third lens group GR3 is, as in Example 1, capable of moving by the vibration-proof lens unit 12 in a direction substantially orthogonal to an optical axis AX.

[Fourth Lens Group]

The fourth lens group GR4 includes a seventh lens element L7, an eighth lens element L8, and a ninth lens element L9. The lenses have characteristics as described below:
The seventh lens element L7: is a positive lens element convex on the both sides;
The eighth lens element L8: is a positive lens element convex on the both sides; and
The ninth lens element L9: is a negative meniscus lens element concave on the object side.

The eighth lens element L8 and the ninth lens element L9 are cemented together on s17 to form a cemented lens element.

[Fifth Lens Group]

The fifth lens group GR5 is formed with a tenth lens element L10. This tenth lens element L10 is a negative lens concave on the both sides. Both surfaces of the tenth lens element L10 (s19* and s20*) are formed as aspheric surfaces.

[Sixth Lens Group]

The sixth lens group GR6 includes the eleventh lens element L11 and a low pass filter LF. This eleventh lens element L11 and the low pass filter LF have characteristics as described below:
The eleventh lens element L11: is a positive meniscus lens element convex on the object side (where s21* is an aspheric surface); and The low pass filter LF: is a filter formed with two surfaces (s23 and s24), and, as in Example 1, also an optical filter having a predetermined cutoff frequency characteristic determined by a pixel pitch of the image sensor SR.

[2-1-3. Configuration of the Variable Magnification Optical System of Example 3 (see FIG. 9)]

The variable magnification optical system OS of Example 3 includes, in order from the object side to the image side, a first lens group GR1, a second lens group GR2, a third lens group GR3, a fourth lens group GR4, a fifth lens group GR5, and a low pass filter LF. That is, this variable magnification optical system OS of Example 3, unlike Examples 1 and 2, does not have a powerful sixth lens group GR6, but has, at the sixth position from the object side, the low pass filter LF having no optical power.

[First Lens Group]

The first lens group GR1 includes: in order from the object side, a first lens element L1 and an optical prism PR. This first lens group GR1 has a "negative" overall optical power.

The first lens element L1 and the optical prism PR have characteristics as described below:

The first lens L1: is a negative meniscus lens element convex on the object side (where s2* is an aspherical surface); and The optical prism PR: is, as in Examples 1 and 2, a prism capable of bending rays of light from the object side at a right angle, in which s3 is a surface where rays of light enter and s4 is a surface from which the rays of light exit.

[Second Lens Group]

The second lens group GR2 includes: in order from the object side, a second lens element L2, a third lens element L3, and a fourth lens element L4. The second lens group GR2 has a "positive" overall optical power.

The lenses have characteristics as described below:

The second lens element L2: is a negative meniscus lens element convex on the object side;

The third lens element L3: is a positive lens element convex on the both sides; and The fourth lens element L4: is a positive lens element convex on the both sides.

The second lens element L2 and the third lens element L3 are cemented together on s6 to form a cemented lens element.

[Third Lens Group]

The third lens group GR3 includes a fifth lens element L5, a sixth lens element L6, a seventh lens element L7, and an optical aperture stop ST. The third lens group GR3 has a "negative" overall optical power.

The lenses and the optical aperture stop ST have characteristics as described below:

The fifth lens L5: is a negative lens element concave on the both sides;

The sixth lens element L6: is a positive lens element convex on the both sides;

The seventh lens element L7: is a negative lens element concave on the both sides; and The optical aperture stop ST: is, as in Examples 1 and 2, an aperture stop which partially blocks rays of light which have passed through the first lens group GR1 and the second lens group GR2, is integrated with the third lens group GR3, and is also expressed as s15.

The sixth lens element L6 and the seventh lens element L7 are cemented together on s13 to form a cemented lens element.

This third lens group GR3 is, as in Examples 1 and 2, capable of moving by the vibration-proof lens unit 12 in a direction substantially orthogonal to an optical axis AX.

[Fourth Lens Group]

The fourth lens group GR4 includes an eighth lens element L8, a ninth lens element L9, a tenth lens element L10, and an eleventh lens element L11. This fourth lens group GR4 has a "positive" overall optical power.

The lenses have characteristics as described below:

The eighth lens element L8: is a positive lens element convex on the both sides;

The ninth lens element L9: is a positive lens element convex on the both sides;

The tenth lens element L10: is a negative lens element concave on the both sides; and The eleventh lens element L11: is a negative meniscus lens element concave on the object side (where s21* and s22* are aspheric surfaces).

The ninth lens element L9 and the tenth lens element L10 are cemented together on s19 to form a cemented lens element.

[Fifth Lens Group]

The fifth lens group GR5 is formed with a twelfth lens element L12. This twelfth lens element L12 is a positive meniscus lens element concave on the object side. Thus, this fifth lens group GR5 (that is, the twelfth lens element L12) has a "positive" overall optical power. Both surfaces of the twelfth lens element L12 (s23* and s24*) are formed as aspheric surfaces.

[Low Pass Filter]

The low pass filter LF is a filter formed with two surfaces (s25 and s26), and, as also, in Examples 1 and 2, an optical filter having a predetermined cutoff frequency characteristic determined by a picture pitch of the image sensor SR.

[2-2. Construction Data for the Variable Magnification Optical Systems of Examples 1 to 3]

Next, construction data for the variable magnification optical systems of Examples 1 to 3 will be described with reference to Tables 1 to 6.

Symbol ri in these tables denotes a radius of curvature (in mm) of each surface (si). An aspherical surface is suffixed with an asterisk (*). Symbol di denotes an axial surface distance (in mm) between the i-th surface (si) and the (i+1)-th surface (si+1). In a case where the axial surface distance (intergroup distance) varies by zooming, di at the wide-angle end position (W), di at the intermediate focal length position (M), and di at the telephoto end position (T) are indicated in this order.

Symbols Ni and υi denote the refractive index (Nd) and Abbe number (vd) possessed by a medium at the axial surface distance (di). The refractive index (Nd) and the Abbe number (vd) are provided for a d-line (wavelength 587.56 nm).

The "focal length position" implies the wide-angle end position (W; shortest focal length position) to the intermediate focal length position (M) to the telephoto end position (T; longest focal length position). Numerals f, FNO, and "2ω" denote the focal length (in mm), f-number, and an angle of view, respectively, of the entire system corresponding to the respective focal length position (W), (M), and (T).

The aspherical surface described above is defined by formula below (definitional equation 1):

$$X(H) = C_0 \cdot H^2 / (1 + \sqrt{1 - \epsilon \cdot C_0^2 \cdot H^2}) + \Sigma A_j \cdot H^j \quad \text{(Definitional equation 1)},$$

where
- H denotes the height in the direction perpendicular to the optical axis AX;
- X(H) denotes the displacement in the direction of the optical axis AX at the height H;
- $C_0$ denotes the paraxial curvature (=1/ri);
- $\epsilon$ denotes the quadric surface parameter;
- j denotes the order of the aspherical surface; and
- Aj denotes the aspherical surface coefficient of order j.

Tables 2, 4, and 6 show data on the aspherical surfaces (aspherical surface data). Here, it should be noted that the coefficient of any term that does not appear in the tables equals zero, and that, for all the data, E–n stands for $\times 10^{-n}$.

[2-3. Movement of Each Lens Group in the Variable Magnification Optical Systems of Examples 1 to 3]

Now, the movement of each lens group in the variable magnification optical systems OS of Examples 1 to 3 will be described.

Upon zooming from the wide angle end (W) to the telephoto end (T) or the like (magnification variation or the like), the variable magnification optical system OS moves the lens groups GRs along the optical axis AX.

Figure 1:
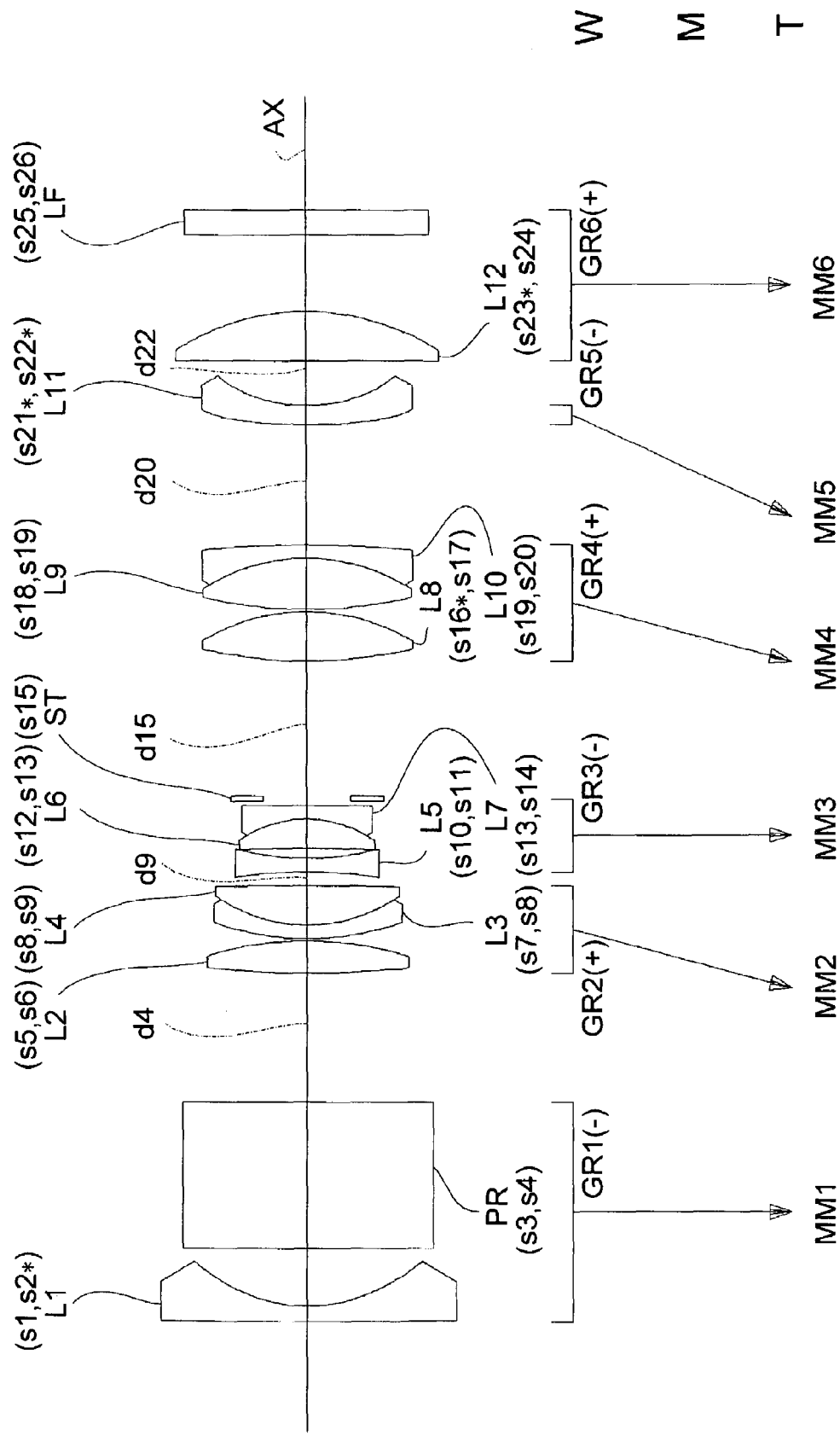
FIG. 1 is a lens sectional view with a variable magnification optical system of Example 1 developed in a row.

In FIGS. 1, 5, and 9, only the axial surface distances (di) where interval fluctuation occurs following the zooming operation are numbered. An arrow "MMi" in the figures schematically indicates the locus of each lens group GR from the wide angle end (W) to the intermediate focal length position position (M), and further from the intermediate focal length position position (M) to the telephoto end (T). The symbol i in MMi denotes the position placed from the object side to the image side, and thus corresponds to the position of the respective lens group GR.

The movement of each lens group GR from the wide angle end (W) to the telephoto end (T) is as described below. The interval between the lens groups GR (group interval) is expressed through comparison between the interval at the wide angle end (W) and the interval at the telephoto end (T). Therefore, even if the interval at the intermediate focal length position position (M) is narrower than the interval at the wide angle end (W), as long as the interval at the telephoto end (T) is wider than the interval at the wide angle end (W), the interval concerned can be expressed as increasing before reaching from the wide angle end (W) to the telephoto end (T).

[2-3-1. Variable Magnification Optical Systems of Examples 1 and 2]

The first lens group GR1: is immobile, more specifically, fixed with respect to the image surface of the image sensor SR;

The second lens group GR2: moves toward the object side;

The third lens group GR3: is immobile, and, as the first lens group GR1, fixed with respect to the image surface of the image sensor SR;

The fourth lens group GR4: moves toward the object side;

The fifth lens GR5: moves toward the object side; and

The sixth lens group GR6: is immobile, and, as the first lens group GR1 and the third lens group GR3, fixed with respect to the image surface of the image sensor SR.

The variable magnification optical system OS of Example 1, in zooming from the wide angle end (W) to the telephoto end (T), narrows down the interval between the first lens group GR1 and the second lens group GR2, widens the interval between the second lens group GR2 and the third lens group GR3, narrows down the interval between the third lens group GR3 and the fourth lens group GR4 and the interval between the fourth lens group GR4 and the fifth lens group GR5, and widens the interval between the fifth lens group GR5 and the sixth lens group GR6.

On the other hand, the variable magnification optical system OS of Example 2, in zooming from the wide angle end (W) to the telephoto end (T), narrows down the interval between the first lens group GR1 and the second lens group GR2, widens the interval between the second lens group GR2 and the third lens group GR3, narrows down the interval between the third lens group GR3 and the fourth lens group GR4, widens the interval between the fourth lens group GR4 and the fifth lens group GR5, and widens the interval between the fifth lens GR5 and the sixth lens group GR6.

[2-3-2. Variable Magnification Optical System of Example 3]

The first lens group GR1: is immobile, as in Examples 1 and 2, fixed with respect to the image surface of the image sensor SR;

The second lens group GR2: moves toward the object side;

The third lens group GR3: is immobile, and, as the first lens group GR1, fixed with respect to the image surface of the image sensor SR;

The fourth lens group GR4: moves toward the object side;

The fifth lens GR5: moves toward the image side; and

The low pass filter LF: is immobile, and, as the first lens group GR1 and the third lens group GR3, fixed with respect to the image surface of the image sensor SR (The low pass filter LF is located at the sixth position from the object side, and thus the locus thereof is expressed as MM6).

On the other hand, the variable magnification optical system OS of Example 3, in zooming from the wide angle end (W) to the telephoto end (T), narrows down the interval between the first lens group GR1 and the second lens group GR2, widens the interval between the second lens group GR2 and the third lens group GR3, narrows down the interval between the third lens group GR3 and the fourth lens group GR4, widens the interval between the fourth lens group GR4 and the fifth lens group GR5, and narrows down the interval between the fifth lens GR5 and the low pass filter LF.

[2-4. Aberration in the Variable Magnification Optical Systems of Examples 1 to 3]

[2-4-1. Spherical Aberration, Astigmatism, and Distortion]

FIGS. 2A to 2I, 6A to 6I, and 10 10A to 10I show spherical aberration, astigmatism, and distortion in the variable magnification optical systems of Examples 1 to 3 during zooming. FIGS. 6A to 6I and FIGS. 10A to 10I are expressed in the same manner as FIGS. 2A to 2I.

Figure 2A:
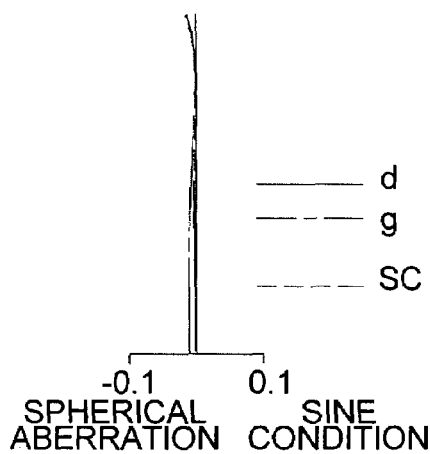
FIG. 2A is an aberration diagram showing spherical aberration at the wide angle end (W) in zooming performed with the variable magnification optical system of Example 1.
Figure 2B:
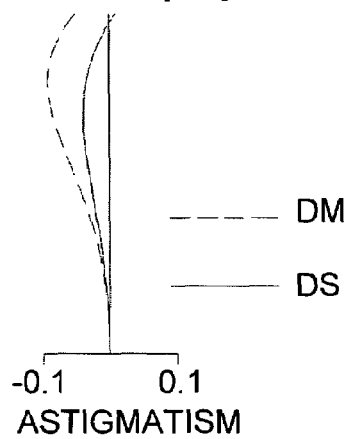
FIG. 2B is an aberration diagram showing astigmatism at the wide angle end (W) in zooming performed with the variable magnification optical system of Example 1.
Figure 2C:
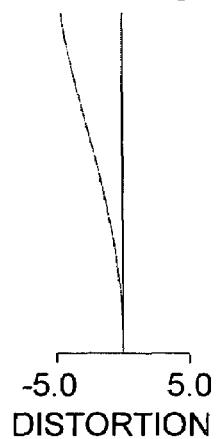
FIG. 2C is an aberration diagram showing distortion at the wide angle end (W) in zooming performed with the variable magnification optical system of Example 1.
Figure 2D:
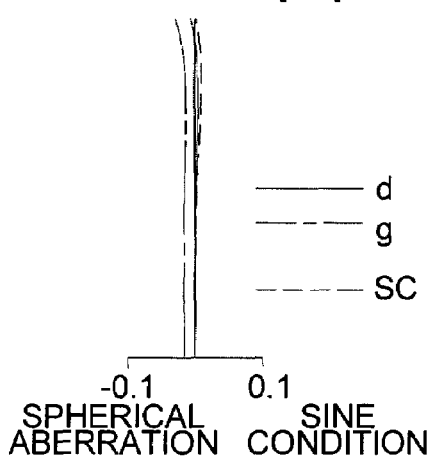
FIG. 2D is an aberration diagram showing spherical aberration at the intermediate focal length position (M) in zooming performed with the variable magnification optical system of Example 1.
Figure 2E:
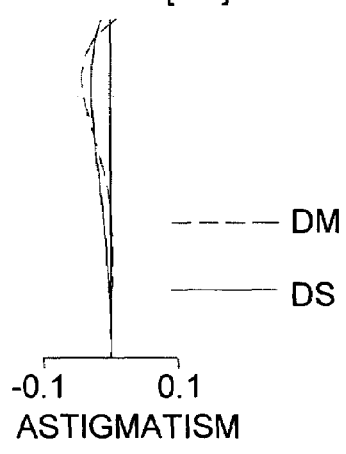
FIG. 2E is an aberration diagram showing astigmatism at the intermediate focal length position (M) in zooming performed with the variable magnification optical system of Example 1.
Figure 2F:
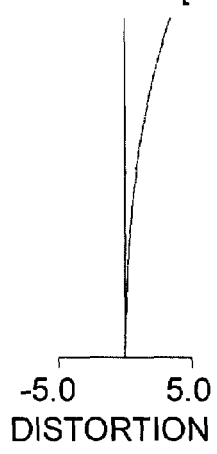
FIG. 2F is an aberration diagram showing distortion at the intermediate focal length position (M) in zooming performed with the variable magnification optical system of Example 1.
Figure 2G:
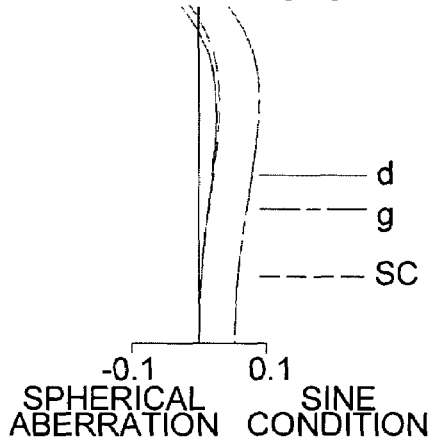
FIG. 2G is an aberration diagram showing spherical aberration at the telephoto end (T) in zooming performed with the variable magnification optical system of Example 1.
Figure 2H:
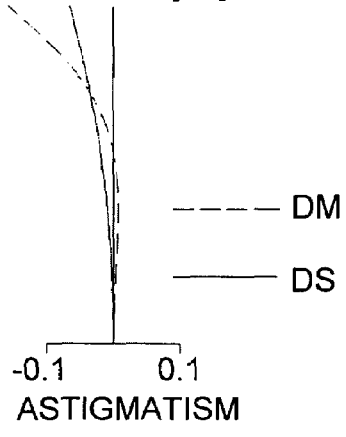
FIG. 2H is an aberration diagram showing astigmatism at the telephoto (T) end in zooming performed with the variable magnification optical system of Example 1.
Figure 2I:
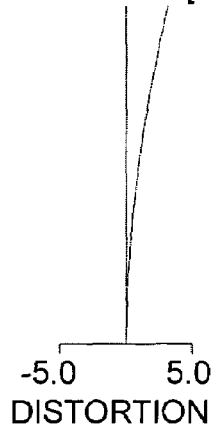
FIG. 2I is an aberration diagram showing distortion at the telephoto end (T) in zooming performed with the variable magnification optical system of Example 1.
Figure 4D:
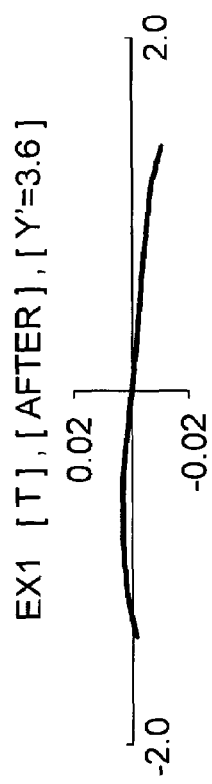
FIG. 4D is a lateral aberration diagram at the telephoto end (T) in the variable magnification optical system of Example 1 after movement of the third lens group (where Y'=3.6)
Figure 4E:
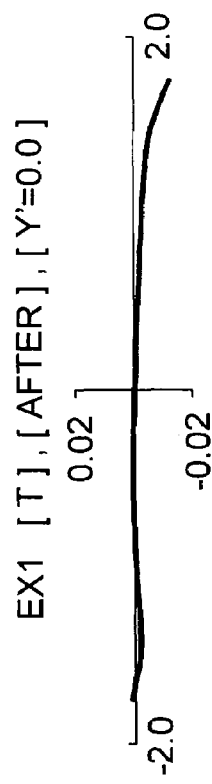
FIG. 4E is a lateral aberration diagram at the telephoto end (T) in the variable magnification optical system of Example 1 after movement of the third lens group (where Y'=0.0)
Figure 4F:
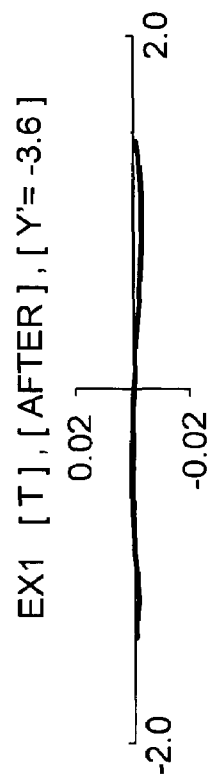
FIG. 4F is a lateral aberration diagram at the telephoto end (T) in the variable magnification optical system of Example 1 after movement of the third lens group (where Y'=−3.6)
Figure 4A:
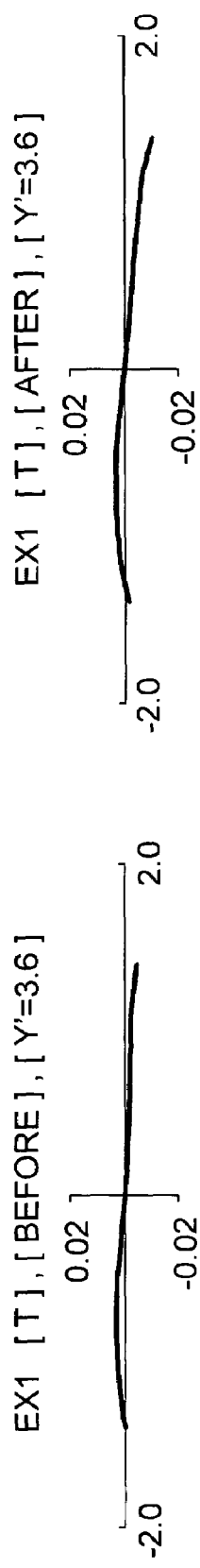
FIG. 4A is a lateral aberration diagram at the telephoto end (T) in the variable magnification optical system of Example 1 before movement of the third lens group (where Y'=3.6)
Figure 4B:
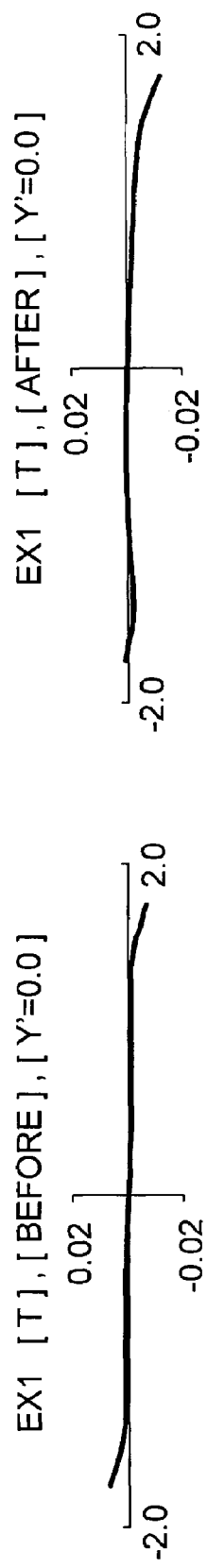
FIG. 4B is a lateral aberration diagram at the telephoto end (T) in the variable magnification optical system of Example 1 before movement of the third lens group (where Y'=0.0)
Figure 4C:
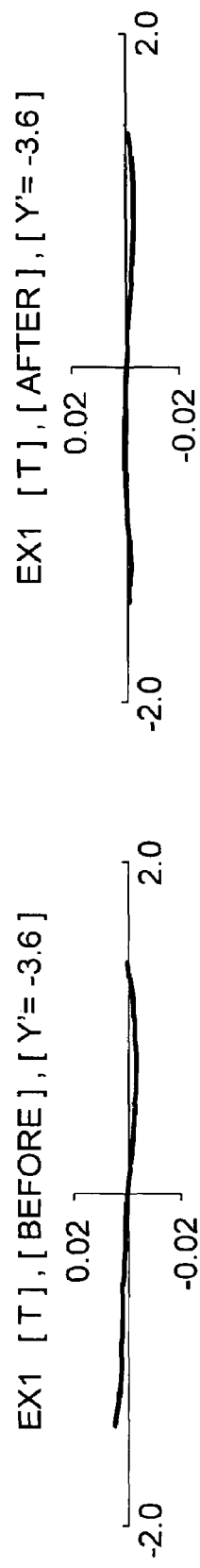
FIG. 4C is a lateral aberration diagram at the telephoto end (T) in the variable magnification optical system of Example 1 before movement of the third lens group (where Y'=−3.6)
Figure 8A:
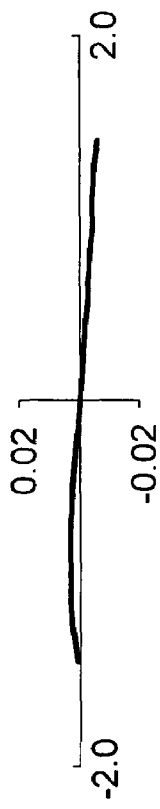
FIG. 8A is a lateral aberration diagram at the telephoto end (T) for the variable magnification optical system of Example 2 before movement of the third lens group (where Y'=3.6)
Figure 8B:
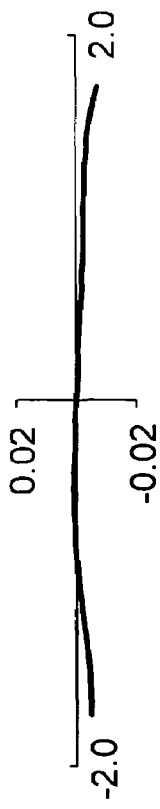
FIG. 8B is a lateral aberration diagram at the telephoto end (T) for the variable magnification optical system of Example 2 before movement of the third lens group (where Y'=0.0)
Figure 8C:
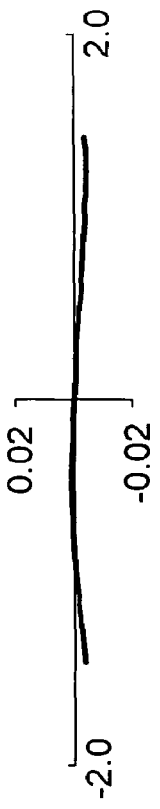
FIG. 8C is a lateral aberration diagram at the telephoto end (T) for the variable magnification optical system of Example 2 before movement of the third lens group (where Y'=−3.6)
Figure 8D:
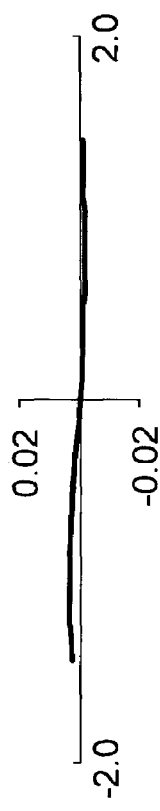
FIG. 8D is a lateral aberration diagram at the telephoto end (T) for the variable magnification optical system of Example 2 after movement of the third lens group (where Y'=3.6)
Figure 8E:
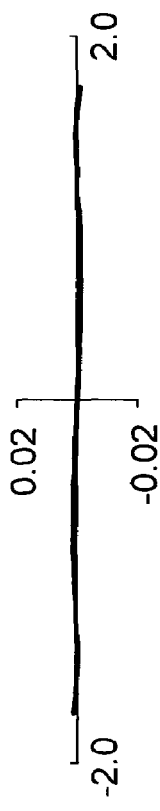
FIG. 8E is a lateral aberration diagram at the telephoto end (T) for the variable magnification optical system of Example 2 after movement of the third lens group (where Y'=0.0)
Figure 8F:
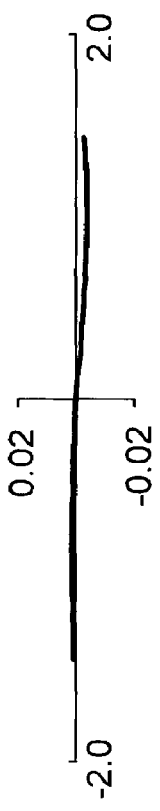
FIG. 8F is a lateral aberration diagram at the telephoto end (T) for the variable magnification optical system of Example 2 after movement of the third lens group (where Y'=−3.6)
Figure 10A:
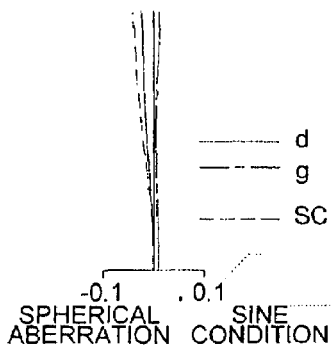
FIG. 10A is an aberration diagram showing spherical aberration at the wide angle end (W) in zooming performed with the variable magnification optical system of Example 3.
Figure 10B:
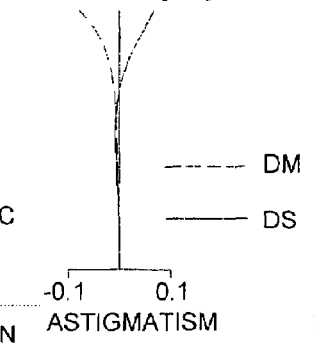
FIG. 10B is an aberration diagram showing astigmatism at the wide angle end (W) in zooming performed with the variable magnification optical system of Example 3.
Figure 10C:
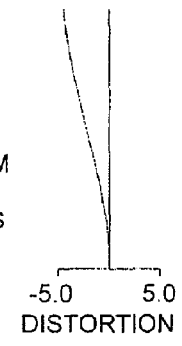
FIG. 10C is an aberration diagram showing distortion at the wide angle end (W) in zooming performed with the variable magnification optical system of Example 3.
Figure 10D:
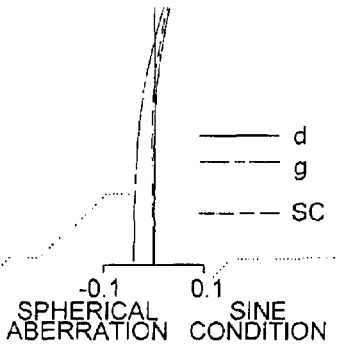
FIG. 10D is an aberration diagram showing spherical aberration at the intermediate focal length position (M) in zooming performed with the variable magnification optical system of Example 3.
Figure 10E:
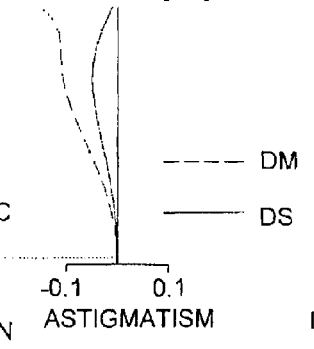
FIG. 10E is an aberration diagram showing astigmatism at the intermediate focal length position (M) in zooming performed with the variable magnification optical system of Example 3.
Figure 10F:
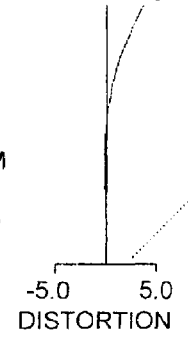
FIG. 10F is an aberration diagram showing distortion at the intermediate focal length position (M) in zooming performed with the variable magnification optical system of Example 3.
Figure 10G:
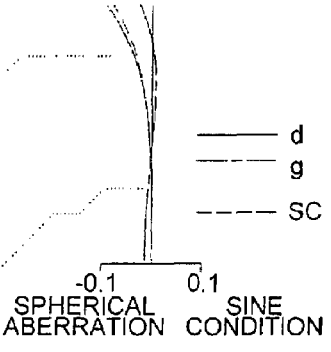
FIG. 10G is an aberration diagram showing spherical aberration at the telephoto end (T) in zooming performed with the variable magnification optical system of Example 3.
Figure 10H:
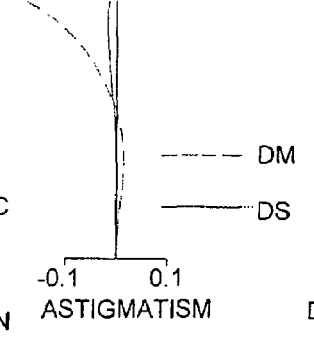
FIG. 10H is an aberration diagram showing astigmatism at the telephoto end (T) end in zooming performed with the variable magnification optical system of Example 3.
Figure 10I:
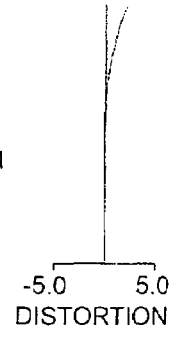
FIG. 10I is an aberration diagram showing distortion at the telephoto end (T) in zooming performed with the variable magnification optical system of Example 3.
Figure 11A:
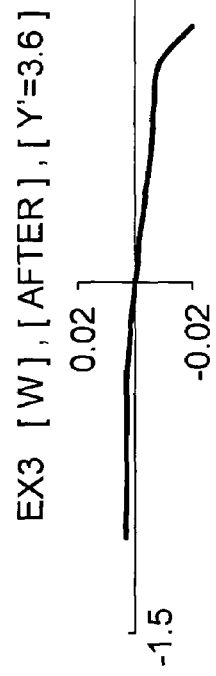
FIG. 11A is a lateral aberration diagram at the wide angle end (W) for the variable magnification optical system of Example 3 before movement of a third lens group (where Y'=3.6)
Figure 11B:
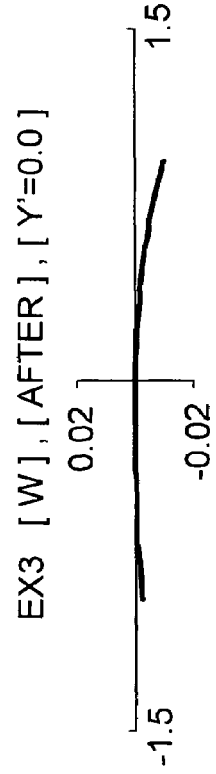
FIG. 11B is a lateral aberration diagram at the wide angle end (W) for the variable magnification optical system of Example 3 before movement of the third lens group (where Y'=0.0)
Figure 11C:
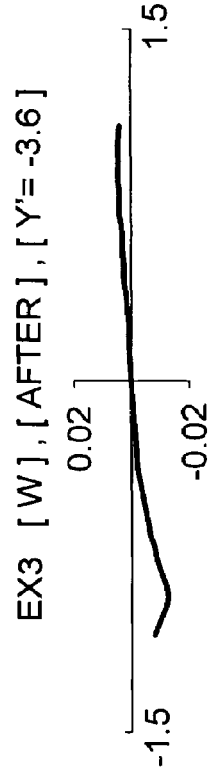
FIG. 11C is a lateral aberration diagram at the wide angle end (W) for the variable magnification optical system of Example 3 before movement of the third lens group (where Y'=−3.6)
Figure 11D:
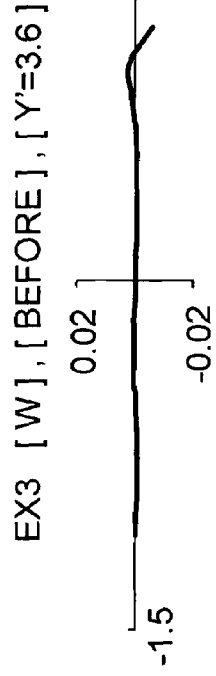
FIG. 11D is a lateral aberration diagram at the wide angle end (W) for the variable magnification optical system of Example 3 after movement of the third lens group (where Y'=3.6)
Figure 11E:
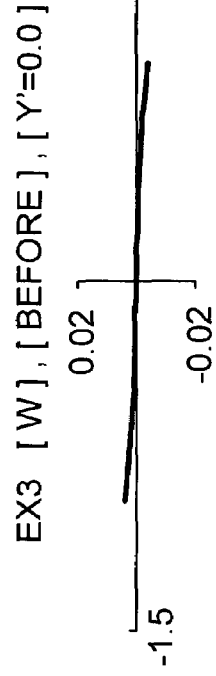
FIG. 11E is a lateral aberration diagram at the wide angle end (W) for the variable magnification optical system of Example 3 after movement of the third lens group (where Y'=0.0)
Figure 11F:
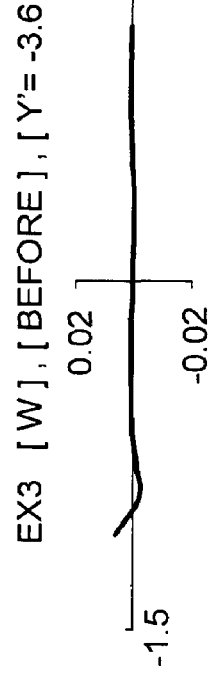
FIG. 11F is a lateral aberration diagram at the wide angle end (W) for the variable magnification optical system of Example 3 after movement of the third lens group (where Y'=−3.6)
Figure 12A:
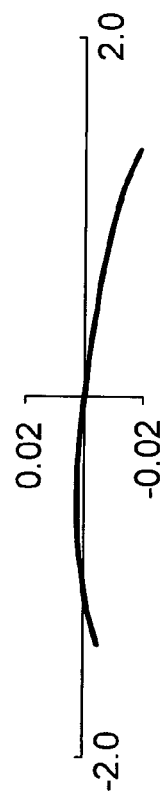
FIG. 12A is a lateral aberration diagram at the telephoto end (T) for the variable magnification optical system of Example 3 before movement of the third lens group (where Y'=3.6)
Figure 12B:
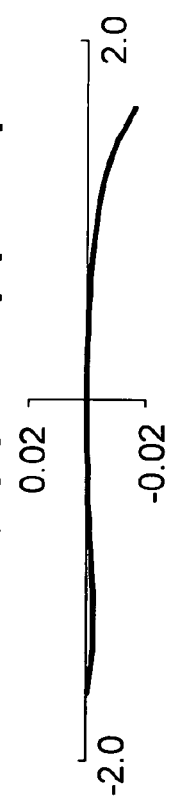
FIG. 12B is a lateral aberration diagram at the telephoto end (T) for the variable magnification optical system of Example 3 before movement of the third lens group (where Y'=0.0)
Figure 12C:
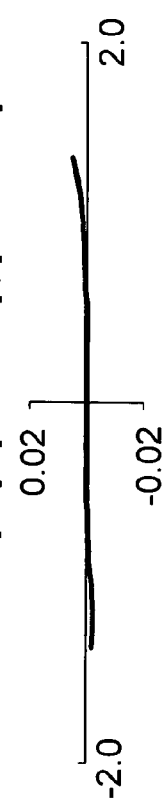
FIG. 12C is a lateral aberration diagram at the telephoto end (T) for the variable magnification optical system of Example 3 before movement of the third lens group (where Y'=−3.6)
Figure 12D:
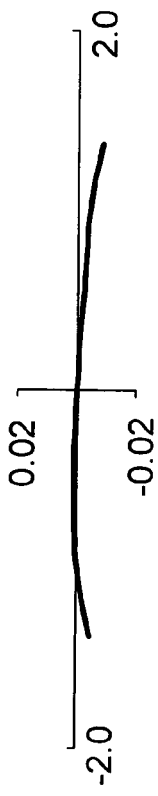
FIG. 12D is a lateral aberration diagram at the telephoto end (T) for the variable magnification optical system of Example 3 after movement of the third lens group (where Y'=3.6)
Figure 12E:
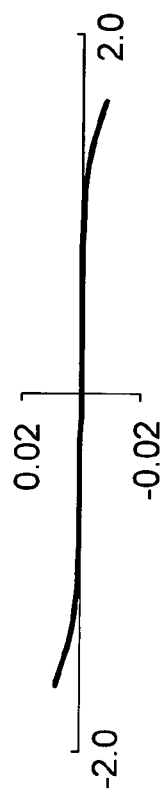
FIG. 12E is a lateral aberration diagram at the telephoto end (T) for the variable magnification optical system of Example 3 after movement of the third lens group (where Y'=0.0)
Figure 12F:
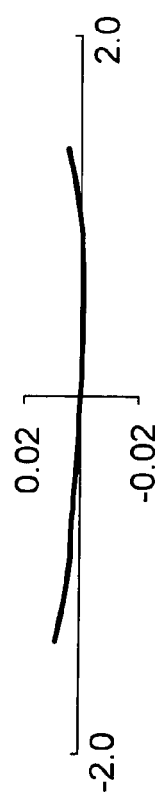
FIG. 12F is a lateral aberration diagram at the telephoto end (T) for the variable magnification optical system of Example 3 after movement of the third lens group (where Y'=−3.6)

More specifically, FIGS. 2A to 2C show aberration at the wide angle end (W), FIGS. 2D to 2F show aberration at the intermediate focal length position position (M), and FIGS. 2G to 2I show aberration at the telephoto end (T).

FIGS. 2A, 2D, and 2G show spherical aberration and sine condition. In these figures, the vertical axis denotes the incidence height, and the lines denote the following (note that FNo. is also indicated):
- d-line (solid line): denotes spherical aberration (in mm) for d-line (wavelength 587.6 nm);
- g-line (dashed line): denotes spherical aberration (in mm) for g-line (wavelength 435.8 nm); and
- SC-line (broken line): denotes the degree of deviation from sine condition (in mm).

FIGS. 2B, 2E, and 2H show astigmatism. In these figures, the vertical axis denotes the maximum image height (Y' in mm), and the lines denote the following:
- DM-Line (broken line): denotes astigmatism (in mm) for d-line on the meridional surface; and
- DS-line (solid line): denotes astigmatism (in mm) for d-line on the sagittal surface.

FIGS. 2C, 2F, and 2I show distortion. In these figures, the vertical axis denotes the maximum image height (Y' in mm), and the solid line denotes distortion for d-line (in %).

[2-4-2. Lateral Aberration]

FIGS. 3A to 3F, 4A to 4F, 7A to 7F, 8A to 8F, 11A to 11F, and 12A to 12F show lateral aberration in the variable magnification optical systems of Examples 1 to 3 during zooming. FIGS. 7A to 7F, 8A to 8F, 11A to 11F, and 12A to 12F are expressed in the same manner as FIGS. 3A to 3F and 4A to 4F.

More specifically, FIGS. 3A to 3F show the lateral aberration at the wide angle end (W), and FIGS. 4A to 4F show the lateral aberration at the telephoto end (T). In particular, FIGS. 3A to 3F and 4A to 4F show the lateral aberration separately before and after movement of the third lens group GR3 in the direction substantially orthogonal to the optical axis AX. More specifically, in FIGS. 3A to 3F and 4A to 4F, FIGS. 3A to 3C (FIGS. 4A to 4C) show the lateral aberration before the movement of the third lens group GR3, and FIGS. 3D to 3F (FIGS. 4D to 4F) show the lateral aberration after the movement of the third lens group GR3.

In these figures, the vertical axis denotes the degree of aberration (in mm) and the horizontal axis denotes the position on the incidence pupil through which each ray of light passes (in mm). The angle of camera-shake correction is 0.5 degrees at the wide angle end (W) and 0.2 degrees at the telephoto end (T).

[3. One Example of Various Characteristics]

As described above, the variable magnification optical system OS of the invention has a plurality of lens groups GR for imaging light from the object side on the image surface of the image sensor SR. In the variable magnification optical system OS of all the examples, the plurality of lens groups GR include at least: in order from the object side to the image side, the first lens group GR1 having a negative optical power, the second lens group GR2 having a positive optical power, the third lens group GR3 having a negative optical power, and the fourth lens group GR4 having a positive optical power.

In the variable magnification optical system OS, in zooming from the wide angle end (W) to the telephoto end (T), in the optical axis direction, the third lens group GR3 is immobile with respect to the image surface, but at least the second lens group GR2 and the fourth lens group GR4 move. Specifically, in zooming from the wide angle end (W) to the telephoto end (T), at least the second lens group GR2 and the fourth lens group GR4 move so that the interval between the first lens group GR1 and the second lens group GR2 decreases, the interval between the second lens group GR2 and the third lens group GR3 increases, the interval between the third lens group GR3 and the fourth lens group GR4 decreases.

In zooming from the wide angle end (W) to the telephoto end (T), the variable magnification optical system OS moves the third lens group GR3 in the in-surface direction vertical to the optical axis direction to thereby correct shake resulting from imaging on the image surface (correct camera shake).

In focusing, the variable magnification optical system OS moves the fifth lens group GR5.

It is preferable that the variable magnification optical system OS as described above satisfy conditional formula (1) below. This conditional formula (1) defines balance between suppressing aberration attributable to the second lens group GR2 and downsizing of the third lens group GR3.

$$0.7 \leq f2/\sqrt{(fw \times ft)} \leq 1.3 \quad \text{Conditional formula (1),}$$

where f2: denotes the focal length of the second lens group GR2 (in mm);

fw: denotes the focal length (in mm) of the entire variable magnification optical system OS (entire system) at the wide angle end (W); and ft: denotes the focal length (in mm) of the entire variable magnification optical system OS (entire system) at the telephoto end (T).

$\sqrt{(fw \times ft)}$ can also be referred to as the focal length of the entire system at the intermediate focal length position (M).

For example, if the value of $f2/\sqrt{(fw \times ft)}$ is lower than the lower limit of the conditional formula (1) because the focal length of the second lens group GR2 is short, the positive optical power of the second lens group GR2 is relatively strong. Thus, various aberration is likely to occur over the entire zoom range. However, when the positive optical power of the second lens group GR2 is relatively strong, a beam of light traveling from this second lens group GR2 toward the third lens group GR3 is converged and thereby made thin, thus permitting reducing the size (effective diameter or the like) of the third lens group GR3 which receives the thinned beam of light.

On the other hand, for example, if the value of $f2/\sqrt{(fw \times ft)}$ is larger than the upper limit of the Conditional formula (1) because the focal length of the second lens group GR2 is long, the positive optical power of the second lens group GR2 is relatively weak. Thus, various aberration is less likely to occur over the entire zoom range. However, when the positive optical power of the second lens group GR2 is relatively weak, a beam of light traveling from this second lens group GR2 toward the third lens group GR3 is less likely to be converged, thus increasing the size of the third lens group GR3 which receives the relatively thick beam of light insufficiently converged.

Therefore, setting the focal length of the second lens group GR2 and the focal length of the variable magnification optical system OS at the intermediate focus position (M) so that they fall within the range of the conditional formula (1) suppresses aberration attributable to the second lens group GR2 and also reduces the size of the third lens group GR3.

Therefore, for camera-shake correction, the thrust force of a motor which moves the third lens group GR3 (vibration-proof lens group driving motor) may be small (that is, a small-size vibration-proof lens group driving motor may be used). Moreover, the third lens group GR3 itself (for example, the effective diameter itself of the third lens group GR3) is relatively small, which permits easy arrangement of the vibration-proof lens group driving motor, a vibration-proof lens group transmission mechanism, and the like in space provided around the third lens group GR3. Therefore, this variable magnification optical system OS is suitable for being loaded in a small-size, compact DSC 29.

Results of the conditional formula (1) are shown below in correspondence with the variable magnification optical systems OS of Examples 1 to 3:

Example 1: 0.826;
Example 2: 1.007; and
Example 3: 0.866.

It is further preferable that, within the conditional range defined by the conditional formula (1), a range of conditional formula (1a) below be fulfilled:

$$0.8 \leq f2/\sqrt{(fw \times ft)} \leq 1.1 \quad \text{Conditional formula (1)'.}$$

It is preferable that the variable magnification optical system OS fulfill conditional formula (2) below. This Conditional formula (2) defines the zooming load (magnification variation load) imposed on the third lens group GR3 which moves in the in-surface direction vertical to the optical axis direction for camera shake correction.

$$0.4 \leq \beta 3t/\beta 3w \leq 2.2 \quad \text{Conditional formula (2),}$$

where

β3t: denotes the lateral magnification ratio of the third lens group GR3 at the telephoto end (T); and β3w: denotes the lateral magnification ratio of the third lens group GR3 at the wide angle end (W).

For example, if the value of β3t/β3w is smaller than the lower limit of the conditional formula (2) since the lateral magnification ratio of the third lens group GR3 at the telephoto end (T) is relatively small and the lateral magnification ratio of the third lens group GR3 at the wide angle end (W) is relatively large, the zooming load imposed on the third lens group GR3 is relatively small, while the zooming load imposed on the other lens groups GRs is relatively large. Thus, due to the small zooming load, aberration attributable to the movement of the third lens group GR3 in camera shake correction (that is, decentering aberration, aberration attributable to decentering of the third lens group GR3) is less likely to occur. However, due to the large zooming load imposed on the other lens groups GRs (for example, the second lens group GR2), various aberration (that is, aberration attributable to the other lens groups GRs) occurs accordingly.

On the other hand, for example, if the value of β3t/β3w is larger than the upper limit of the conditional formula (2) since the lateral magnification ratio of the third lens group GR3 at the telephoto end (T) is relatively large and the lateral magnification ratio of the third lens group GR3 at the wide angle end (W) is relatively small, the zooming load imposed on the third lens group GR3 is relatively large, while the zooming load imposed on the other lens groups GRs is relatively small. Thus, occurrence of various aberration attributable to the other lens groups GRs is suppressed, but decentering aberration attributable to the movement of the third lens group GR3 is likely to occur. In zooming from the wide end angle (W) to the telephoto end (T) in particular, the third lens group GR3 moves for camera shake correction as appropriate, and thus decentering aberration occurs over the entire zoom range.

Therefore, setting the lateral magnification ratio of the third lens group GR3 at the wide angle end (W) and the telephoto end (T) so that they fall within the range of the conditional formula (2) suppresses aberration attributable to the other lens groups excluding the third lens group GR3 and also suppresses decentering aberration attributable to the third lens group GR3.

Results of the conditional formula (2) are shown below in correspondence with the variable magnification optical systems OS of Examples 1 to 3:

Example 1: 1.712;
Example 2: 0.951; and
Example 3: 1.456.

It is further preferable that, within the conditional range defined by the conditional formula (2), a range of conditional formula (2)' below be fulfilled:

$$0.8 \leq \beta 3t/\beta 3w \leq 2.0 \qquad \text{Conditional formula (2)'}.$$

The third lens group GR3 has an optical aperture stop ST disposed at the most image side position and also has at least one lens element disposed at a different position. Specifically, the third lens group GR3 in the variable magnification optical systems OS of Examples 1 and 3 is provided with three lens elements, and the third lens group GR3 in the variable magnification optical system OS of Example 2 is provided with two lens elements.

The variable magnification optical system OS, to move the third lens group GR3 in the in-surface direction vertical to the optical axis direction in order to correct shake resulting from imaging (that is, correct camera shake) moves the lens elements in the third lens group GR3 while keeping the optical aperture stop ST immobile.

Even when such a variable magnification optical system OS moves the lens elements in the third lens group GR3 for camera shake correction, due to the presence of the optical aperture stop ST which is immobile with respect to the image surface, the amount of light reaching the image surface is less likely to change. That is, even when the area of the exit pupil changes due to the movement (decentering) of the lens elements in the third lens group GR3, the immobile optical aperture stop ST adjusts the amount of light to a desired level. Therefore, the luminance around a beam of light reaching the image surface is less likely to change due to movement of the third lens group GR3.

Other Embodiments

The invention is not limited to the embodiment described above, and thus various modifications can be made within the range not departing from the spirit of the invention.

For example, to achieve further downsizing, either of an optical prism PR and a reflective mirror which change the optical axis direction through reflection may be included in the first lens group GR1. Such a variable magnification optical system OS does not serve as a variable magnification optical system extending in a straight line (not a straight type variable magnification optical system), but serves as a bending type variable magnification optical system OS.

Thus, the degree of freedom in disposing the variable magnification optical system OS increases. That is, the variable magnification optical system OS downsized by being bent is arranged at appropriate position in the limited housing of the DSC 29, thus reducing the size of the DSC 29 in the height direction, horizontal direction, and the like. Including the optical prism PR in the first lens group GR1 reduces the size in the depth direction of the DSC 29 provided with the variable magnification optical system OS.

Locating the optical prism PR closer to the image side than the lens element (that is, first lens L1) having the largest negative optical power in the first lens group GR1 (in particular, arranging the first lens L1 and the optical prism PR relatively closely to each other) permits effectively bending emitted light and also requires an optical prism PR of a relatively small size.

Further, the first lens group GR1 may be immobile in the optical axis direction with respect to the image surface, because such a variable magnification optical system OS does not have the first lens group GR1 projecting to the object side during zooming and thus can serve as a variable magnification optical system OS suitable for a small-size DSC 29.

The variable magnification optical system OS, upon moving the second lens group GR2 and the fourth lens group GR4 during zooming, may fix the intergroup distance between the both (the second lens group GR2 and the fourth lens group GR4). For example, the second lens group GR2 and the fourth lens group GR4 may be integrated together via a lens frame (coupling part, not shown) and thus may move simultaneously.

As described above, the coupled state (linked state) between the second lens group GR2 and the fourth lens group GR4 simplifies the configuration required for disposing the both lens groups GR2 and GR4 (disposition configuration). Thus, the both lens groups GR2 and GR4 can be stored in, for example, the same lens barrel, not shown, so that the lens barrel is likely to be relatively compact.

Moreover, moving power sources (motors or the like) corresponding to the second lens group GR2 and the fourth lens group GR4, respectively are also no longer required. In addition, a mechanism required for movement (moving mechanism) is simplified. That is, the two lens groups, i.e., the second lens group GR2 and the fourth lens group GR4, can be moved by a simple moving mechanism with a single power source.

The zoom ratio (magnification variation ratio) of the variable magnification optical system OS is not limited to any value in particular, but it is preferable that conditional formula (3) below be fulfilled. This conditional formula (3) represents the zoom ratio of the variable magnification optical system OS.

$$2.9 \leq ft/fw \leq 3.1 \qquad \text{Conditional formula (3),}$$

where
- fw: denotes the focal length (in mm) of the entire variable magnification optical system OS at the wide angle end (W); and
- ft: denotes the focal length (in mm) of the entire variable magnification optical system OS at the telephoto end (T).

When this conditional formula (3) is fulfilled, the variable magnification optical system OS ensures the zoom ratio (approximately 3×) required for a typical, small-size DSC 29.

Results of the conditional formula (3) are shown below in correspondence with the variable magnification optical systems OS of Examples 1 to 3:
- Example 1: 3.0000;
- Example 2: 3.0001; and
- Example 3: 3.0000.

An image-taking apparatus is an optical apparatus which optically takes in an image of a subject and then outputs it as an electric signal, and also which forms a main component of a camera used in still image photographing and moving image photographing of a subject. Examples of such cameras include digital still cameras, video cameras, monitoring cameras, in-vehicle cameras, videophone cameras, door phone cameras, and the like, and also cameras incorporated in or externally fitted to personal computers, portable information appliances (compact, portable information terminal, such as mobile computers, cellular phones, personal digital assistants (PDAs)), peripheral devices therefor (such as mouses, scanners, printers, memories, and the like), other digital appliances, and the like.

As these examples show, by the use of an image-taking lens unit, it is possible not only to build a camera but also to load the image-taking lens unit in various devices to provide them with a camera capability. For example, it is possible to realize a digital appliance provided with an image input capability, such as a camera-equipped cellular phone.

The term "digital still camera" in its conventional sense denotes one that exclusively records optical still pictures, but, now that digital still cameras and home-use digital movie cameras that can handle both still and moving pictures at the same time have been proposed, the term has come to be used to denote either type.

Accordingly, in the present specification, the term "digital still camera" denotes any camera that includes as its main component an image-taking lens system for forming an optical image, an image sensor for converting the optical image into an electrical picture signal, and other components, examples of such cameras including digital still cameras, digital movie cameras, and Web cameras (i.e., cameras that are connected, either publicly or privately, to a device connected to a network to permit transmission and reception of images, including both those connected directly to the network and those connected to the network by way of a device, such as a personal computer, having an information processing capability).

The summary of the description above can also be expressed as follows.

The present invention refers to a variable magnification optical system having a plurality of lens groups for imaging light from the object side on the image surface of an image sensor. Such a plurality of lens include at least: in order from the object side to the image side, the first lens group having a negative optical power, the second lens group having a positive optical power, the third lens group having a negative optical power, and the fourth lens group having a positive optical power.

In this variable magnification optical system, in magnification variation from the wide angle end to the telephoto end, in the optical axis direction, the third lens element is immobile with respect to the image surface while at least the second lens element and the fourth lens element move, whereby the interval between the first lens element and the second lens element decreases, the interval between the second lens element and the third lens element increases, and the interval between the third lens element and the fourth lens element decreases. In this variable magnification optical system, in the magnification variation from the wide angle end to the telephoto end, in the in-surface direction vertical to the optical axis direction, the third lens element moves to thereby correct shake (camera shake correction) resulting from imaging on the image surface.

Moreover, it is preferable that the variable magnification optical system fulfill conditional formula (1) below. This conditional formula (1) defines balance between suppressing aberration attributable to the second lens element and downsizing the third lens element.

$$0.7 \leq f2/\sqrt{(fw \times ft)} \leq 1.3 \qquad \text{Conditional formula (1),}$$

where
- f2: denotes the focal length of the second lens group;
- fw: denotes the focal length of the entire variable magnification optical system at the wide angle end; and
- ft: denotes the focal length of the entire variable magnification optical system at the telephoto end.

For example, if the value of $f2/\sqrt{(fw \times ft)}$ is lower than the lower limit of the conditional formula (1) because the focal length of the second lens group GR2 is short, the positive optical power of the second lens group GR2 is relatively strong, so that various aberration is likely to occur over the entire zoom range. However, when the positive optical power of the second lens group GR2 is relatively strong, an emitted beam of light is converged relatively strongly and thereby made thin, thus reducing the size (effective diameter or the like) of the third lens group GR3 which receives the thinned beam of light.

On the other hand, for example, if the value of $f2/\sqrt{(fw \times ft)}$ is larger than the upper limit of the Conditional formula (1) because the focal length of the second lens group GR2 is long, the positive optical power of the second lens group GR2 is relatively weak. Thus, various aberration is less likely to occur over the entire zoom range. However, when the positive optical power of the second lens group GR2 is relatively weak, an emitted beam of light is not converged relatively strongly, thus increasing the size of the third lens group GR3 which needs to receive the relatively thick beam of light.

Therefore, setting the focal length of the second lens group GR2 and $\sqrt{(fw \times ft)}$ as the focal length at the intermediate focus position (M) in of the variable magnification optical system OS so that they fall within the range of the conditional formula (1) suppresses aberration attributable to the second lens group GR2 and also reduces the size of the third lens group GR3.

Thus, this variable magnification optical system can perform camera shake correction by moving the relatively small-size third lens group. Therefore, the third lens group GR3 can be moved by even a motor with a small thrust force or the like. Moreover, in a space in the vicinity provided by providing the third lens group GR3 itself in a relatively small size, the size motor with a small thrust force or the like can be arranged. Therefore, this variable magnification optical system is suitable for being loaded in a small-size image-taking apparatus.

It is preferable that the variable magnification optical system fulfill conditional formula (2) below. This conditional formula (2) defines the magnification variation load imposed on the third lens group which moves in the in-surface direction vertical to the optical axis direction for camera shake correction.

$$0.4 \leq \beta 3t/\beta 3w \leq 2.2 \qquad \text{Conditional formula (2),}$$

where

β3t: denotes the lateral magnification ratio of the third lens group at the telephoto end; and β3w: denotes the lateral magnification ratio of the third lens group at the wide angle end.

For example, if the value of β3t/β3w is smaller than the lower limit of the conditional formula (2) since the lateral magnification ratio of the third lens group at the telephoto end is relatively small and the lateral magnification ratio of the third lens group at the wide angle end is relatively large, the magnification variation load imposed on the third lens group is relatively small, while the magnification variation load imposed on the other lens groups is relatively large. Thus, due to the small magnification variation load, decentering aberration attributable to the movement of the third lens group in camera shake correction is less likely to occur. However, due to the large magnification variation load imposed on the other lens groups, various aberration occurs accordingly.

On the other hand, for example, if the value of β3t/β3w is larger than the upper limit of the conditional formula (2) since the lateral magnification ratio of the third lens group at the telephoto end is relatively large and the lateral magnification ratio of the third lens group at the wide angle end is relatively small, the magnification variation load imposed on the third lens group is relatively large, while the magnification variation load imposed on the other lens groups is small. Thus, occurrence of various aberration attributable to the other lens groups is suppressed, but decentering aberration attributable to the movement of the third lens group is likely to occur.

Therefore, setting the lateral magnification ratio of the third lens group at the wide angle end and the telephoto end so that they fall within the range of the conditional formula (2) suppresses various aberration attributable to the other lens groups excluding the third lens group and also suppresses decentering aberration attributable to the third lens group.

The third lens group has an optical aperture stop disposed at the most image side position and at least one lens element disposed at different position. When this third lens group moves in the in-surface direction vertical to the optical axis direction to correct shake resulting from imaging, the optical aperture stop is immobile while the lens elements inside the third lens group move.

Even when such a variable magnification optical system moves the lens elements in the third lens group for camera shake correction, the presence of the optical aperture stop which is immobile with respect to the image surface makes it difficult to provide a change in the amount of light reaching the image surface. Therefore, the illumination intensity around a beam of light reaching the image surface is less likely to change due to the movement of the third lens group.

To load a variable magnification optical system in a small-size image-taking apparatus, it is preferable that the variable magnification optical system be formed into such a shape which permits its arrangement in the limited housing of the image-taking apparatus. Thus, it is preferable that the first lens group include an optical axis changing element, because such a variable magnification optical system does not extend in one direction but is formed into a bending shape, which permits its arrangement in the narrow housing.

In the variable magnification optical system, the first lens group is desirably immobile in the optical axis direction with respect to the image surface, because such a variable magnification optical system serves as a variable magnification optical system which does not have the first lens group projecting toward the object side in magnification variation and which is suitable for a small-size image-taking apparatus.

The variable magnification optical system may move the second lens group and the fourth lens group move in a coupled manner, because such a variable magnification optical system has simplified configuration required for disposing these two lens groups.

In the variable magnification optical system, the fifth lens group having a negative or positive optical power may be included on the image side of the fourth lens group.

The variable magnification optical system may fulfill conditional formula (3) below:

$$2.9 \leq ft/fw \leq 3.1 \qquad \text{conditional formula (3)},$$

where fw: denotes the focal length (in mm) of the entire variable magnification optical system OS at the wide angle end (W); and ft: denotes the focal length (in mm) of the entire variable magnification optical system OS at the telephoto end (T).

Needless to say, an image-taking apparatus provided with a variable magnification optical system as described above is one example of the present invention.

The variable magnification optical system may have a plurality of lens elements for imaging light from the object side on the image surface of an image sensor, and these lens groups may composed of: in order from the object side to the image side, a first lens group having a negative optical power, a second lens group having a positive optical power, a third lens group having a negative optical power, and a fourth lens group having a positive optical power.

It is preferable that, in such a variable magnification optical system, in case of magnification variation from the wide angle end to the telephoto end, in the optical axis direction, the third lens group be immobile with respect to the image surface, while at least the second lens group and the fourth lens group move whereby the interval between the first lens group and the second lens group decreases, the interval between the second lens group and the third lens group increases, and the interval between the third lens group and the fourth lens group decreases, and also that the third lens group moves in the in-surface direction vertical to the optical axis direction to thereby correct shake resulting from imaging on the image surface, and further that the conditional formula (1) be fulfilled.

It is preferable that even a variable magnification optical system including four lens groups as described above fulfill the conditional formula (2).

It is preferable that even a variable magnification optical system including four lens groups as described above have an optical axis changing element included in the first lens group thereof, and also that the first lens group be immobile in the optical axis direction with respect to the image surface.

According to the variable magnification optical system of the invention, appropriately setting the focal length of the second lens group and the focal length at the medium focus position in the variable magnification optical system suppresses aberration attributable to the second lens group and also downsizes the third lens group. Since the downsized third lens group moves in the in-surface direction vertical to the optical axis direction for camera shake correction, a motor or the like which moves the third lens group can also be downsized (that is, a motor or the like with a relatively small thrust forces may be used), thus achieving a variable magnification optical system or the like provided with a camera shake correction function which is suitable for a small-size image-taking apparatus.

In the variable magnification optical system of the invention, the four lens elements have a negative, a positive, a negative, and a positive optical powers, thus providing sufficient aberration performance over the magnification variation range closer to the wide angle end.

Even under the presence of the fifth lens group beyond, the axial ray height in these lens groups is relatively small, thus providing small effect of the invention in downsizing (reducing the diameter of) the "third lens group". Thus, when the first to fourth groups are defined to have a negative, a positive, a negative, and a positive optical powers, the effect of the invention can be almost achieved.

The detailed embodiments, examples, and the like described above are just provided to clarify the details of the technology of the invention. Thus, the invention should not be limited to the detailed examples and should not be interpreted in a narrow sense. Therefore, various modifications can be made to the invention within the range of the appended claims.

TABLE 1

| | Focal Length Position | (W)~(M)~(T) |
|---|---|---|
| Example 1 | f[mm] | 5.944~10.046~17.832 |
| | FNo. | 3.341~4.152~5.100 |
| | 2ω[°] | 76.872~46.825~27.492 |

| i | ri[mm] | | i | di[mm] | i | Ni | νi | Elemnt | |
|---|---|---|---|---|---|---|---|---|---|
| 1 | 351.165 | | 1 | 0.700 | 1 | 1.77250 | 49.36 | L1 | GR1 |
| 2 | 6.797 | * | 2 | 2.565 | 2 | AIR | AIR | PR | (−) |
| 3 | ∞ | | 3 | 6.546 | 3 | 1.84666 | 23.78 | | |
| 4 | ∞ | | 4 | 5.722~3.435~0.500 | 4 | AIR | AIR | L2 | GR2 |
| 5 | 40.391 | | 5 | 1.447 | 5 | 1.49700 | 81.61 | | (+) |
| 6 | −15.211 | | 6 | 0.100 | 6 | AIR | AIR | L3 | |
| 7 | 12.740 | | 7 | 0.600 | 7 | 1.84666 | 23.78 | L4 | |
| 8 | 7.254 | | 8 | 1.743 | 8 | 1.88300 | 40.80 | | |
| 9 | −294.605 | | 9 | 0.637~2.924~5.859 | 9 | AIR | AIR | L5 | GR3 |
| 10 | −20.503 | | 10 | 0.600 | 10 | 1.88300 | 40.80 | | (−) |
| 11 | 13.040 | | 11 | 0.441 | 11 | AIR | AIR | L6 | |
| 12 | −88.155 | | 12 | 1.315 | 12 | 1.84666 | 23.78 | | |
| 13 | −5.268 | | 13 | 0.600 | 13 | 1.88300 | 40.80 | L7 | |
| 14 | −3386.970 | | 14 | 0.300 | 14 | AIR | AIR | ST | |
| 15 | ∞ | | 15 | 6.115~3.828~0.893 | 15 | AIR | AIR | L8 | GR4 |
| 16 | 17.803 | * | 16 | 2.210 | 16 | 1.58913 | 61.24 | | (+) |
| 17 | −9.353 | | 17 | 0.100 | 17 | AIR | AIR | L9 | |
| 18 | 20.547 | | 18 | 2.283 | 18 | 1.49700 | 81.61 | | |
| 19 | −8.786 | | 19 | 0.600 | 19 | 1.84666 | 23.78 | L10 | |
| 20 | −46.224 | | 20 | 5.357~2.939~1.500 | 20 | AIR | AIR | L11 | GR5 |
| 21 | 30.062 | * | 21 | 0.850 | 21 | 1.60280 | 28.30 | | (−) |
| 22 | 7.837 | * | 22 | 1.969~6.674~11.048 | 22 | AIR | AIR | L12 | GR6 |
| 23 | 164.680 | * | 23 | 2.198 | 23 | 1.60280 | 28.30 | | (+) |
| 24 | −11.057 | | 24 | 3.401 | 24 | AIR | AIR | LF | |
| 25 | ∞ | | 25 | 1.100 | 25 | 1.51680 | 64.20 | | |
| 26 | ∞ | | | | | | | | |

TABLE 2

| Example 1 | |
|---|---|
| Aspherical Surface Data of Surface 2 (i = 2) | |
| ε | 1.0000 |
| A4 | −3.10989E−04 |
| A6 | −5.45204E−06 |
| A8 | 3.83127E−08 |
| A10 | −3.88721E−09 |
| Aspherical Surface Data of Surface 16 (i = 16) | |
| ε | 1.0000 |
| A4 | −1.94994E−04 |

TABLE 2-continued

| Example 1 | |
|---|---|
| A6 | −4.16737E−06 |
| A8 | 4.03009E−07 |
| A10 | −1.22878E−08 |
| Aspherical Surface Data of Surface 21 (i = 21) | |
| ε | 1.0000 |
| A4 | 3.50328E−04 |
| A6 | 2.04760E−06 |
| A8 | 3.61188E−07 |
| Aspherical Surface Data of Surface 22 (i = 22) | |
| ε | 1.0000 |
| A4 | 6.13304E−04 |

TABLE 2-continued

| Example 1 | |
|---|---|
| A6 | −1.91427E−06 |
| A8 | 7.48724E−07 |
| Aspherical Surface Data of Surface 23 (i = 23) | |
| ε | 1.0000 |
| A4 | −1.44805E−04 |
| A6 | 1.40616E−06 |
| A8 | −6.15318E−09 |

TABLE 3

| | Focal Length Position | | (W)~(M)~(T) | | | |
|---|---|---|---|---|---|---|
| Example 2 | f[mm] | | 5.853~9.892~17.560 | | | |
| | FNo. | | 3.211~3.954~5.100 | | | |
| | 2ω[°] | | 65.882~40.401~23.236 | | | |

| i | ri[mm] | | i | di[mm] | i | Ni | vi | Elemnt | |
|---|---|---|---|---|---|---|---|---|---|
| 1 | 36.658 | | 1 | 0.700 | 1 | 1.77250 | 49.36 | L1 | GR1 |
| 2 | 6.475 | * | 2 | 2.422 | 2 | AIR | AIR | PR | (−) |
| 3 | ∞ | | 3 | 6.500 | 3 | 1.84666 | 23.78 | | |
| 4 | ∞ | | 4 | 7.187~4.121~0.554 | 4 | AIR | AIR | L2 | GR2 |
| 5 | ∞ | | 5 | 1.010 | 5 | 1.58913 | 61.24 | | (+) |
| 6 | −20.965 | | 6 | 0.100 | 6 | AIR | AIR | L3 | |
| 7 | 11.576 | | 7 | 1.676 | 7 | 1.78590 | 43.93 | L4 | |
| 8 | −22.204 | | 8 | 0.600 | 8 | 1.84666 | 23.78 | | |
| 9 | −162.342 | | 9 | 0.618~3.684~7.251 | 9 | AIR | AIR | L5 | GR3 |
| 10 | −19.565 | | 10 | 1.199 | 10 | 1.84666 | 23.78 | | (−) |
| 11 | −5.268 | | 11 | 0.600 | 11 | 1.88300 | 40.80 | L6 | |
| 12 | 18.450 | | 12 | 0.402 | 12 | AIR | AIR | ST | |
| 13 | ∞ | | 13 | 7.549~4.484~0.917 | 13 | AIR | AIR | L7 | GR4 |
| 14 | 22.468 | | 14 | 2.000 | 14 | 1.58913 | 61.24 | | (+) |
| 15 | −10.660 | | 15 | 0.100 | 15 | AIR | AIR | L8 | |
| 16 | 12.349 | | 16 | 2.581 | 16 | 1.49700 | 81.61 | | |
| 17 | −8.786 | | 17 | 0.600 | 17 | 1.84666 | 23.78 | L9 | |
| 18 | −33.960 | | 18 | 2.209~1.603~2.516 | 18 | AIR | AIR | L10 | GR5 |
| 19 | −22.681 | * | 19 | 0.850 | 19 | 1.60280 | 28.30 | | (−) |
| 20 | 11.213 | * | 20 | 1.742~5.413~8.067 | 20 | AIR | AIR | L11 | GR6 |
| 21 | 8.692 | * | 21 | 1.986 | 21 | 1.60280 | 28.30 | | (+) |
| 22 | 53.704 | | 22 | 5.768 | 22 | AIR | AIR | LF | |
| 23 | ∞ | | 23 | 1.100 | 23 | 1.51680 | 64.20 | | |
| 24 | ∞ | | | | | | | | |

TABLE 4

Example 2

Aspherical Surface Data
of Surface 2 (i = 2)

| ε | 1.0000 |
|---|---|
| A4 | −3.42823E−04 |
| A6 | −1.01728E−05 |
| A8 | 2.39218E−07 |
| A10 | −9.02508E−09 |

Aspherical Surface Data
of Surface 19 (i = 19)

| ε | 1.0000 |
|---|---|
| A4 | −7.06319E−05 |
| A6 | 2.69369E−06 |
| A8 | −2.29866E−07 |

TABLE 4-continued

Example 2

Aspherical Surface Data
of Surface 20 (i = 20)

| ε | 1.0000 |
|---|---|
| A4 | −4.70796E−05 |
| A6 | 2.01628E−06 |
| A8 | −3.85764E−07 |

Aspherical Surface Data
of Surface 21 (i = 21)

| ε | 1.0000 |
|---|---|
| A4 | −1.18709E−04 |
| A6 | 9.49720E−07 |
| A8 | −4.80307E−08 |

TABLE 5

| | Focal Length Position | | (W)~(M)~(T) | | | |
|---|---|---|---|---|---|---|
| Example 3 | f[mm] | | 5.944~10.045~17.832 | | | |
| | FNo. | | 3.174~4.025~5.481 | | | |
| | 2ω[°] | | 76.800~46.750~27.767 | | | |

| i | ri[mm] | | i | di[mm] | i | Ni | vi | Elemnt | |
|---|---|---|---|---|---|---|---|---|---|
| 1 | 55.044 | | 1 | 0.700 | 1 | 1.77250 | 49.36 | L1 | GR1 |
| 2 | 6.102 | * | 2 | 2.566 | 2 | AIR | AIR | PR | (−) |
| 3 | ∞ | | 3 | 6.711 | 3 | 1.84666 | 23.78 | | |
| 4 | ∞ | | 4 | 5.138~2.776~0.500 | 4 | AIR | AIR | L2 | GR2 |
| 5 | 56.558 | | 5 | 0.600 | 5 | 1.80518 | 25.46 | | (+) |
| 6 | 7.195 | | 6 | 2.311 | 6 | 1.65844 | 50.84 | L3 | |
| 7 | −36.260 | | 7 | 0.100 | 7 | AIR | AIR | L4 | |
| 8 | 12.558 | | 8 | 1.440 | 8 | 1.88300 | 40.80 | | |
| 9 | −28.125 | | 9 | 0.555~2.918~5.193 | 9 | AIR | AIR | L5 | GR3 |

TABLE 5-continued

| | | | | | | | | |
|---|---|---|---|---|---|---|---|---|
| 10 | −21.562 | | 10 | 0.600 | 10 | 1.88300 | 40.80 | (−) |
| 11 | 10.279 | | 11 | 0.539 | 11 | AIR | AIR | L6 |
| 12 | 2830.492 | | 12 | 1.544 | 12 | 1.84666 | 23.78 | |
| 13 | −5.094 | | 13 | 0.600 | 13 | 1.74400 | 44.90 | L7 |
| 14 | 120.434 | | 14 | 0.331 | 14 | AIR | AIR | ST |
| 15 | ∞ | | 15 | 5.188~2.825~0.55 | 15 | AIR | AIR | L8 GR4 |
| 16 | 6.747 | | 16 | 2.649 | 16 | 1.58913 | 61.24 | (+) |
| 17 | −30.960 | | 17 | 0.300 | 17 | AIR | AIR | L9 |
| 18 | 9.081 | | 18 | 2.279 | 18 | 1.49700 | 81.61 | |
| 19 | −12.481 | | 19 | 0.600 | 19 | 1.84666 | 23.78 | L10 |
| 20 | −8.895 | | 20 | 1.786 | 20 | AIR | AIR | L11 |
| 21 | −14.618 | * | 21 | 1.000 | 21 | 1.58400 | 31.00 | |
| 22 | −29.507 | * | 22 | 2.573~7.280~12.595 | 22 | AIR | AIR | L12 GR5 |
| 23 | −574.582 | * | 23 | 2.406 | 23 | 1.53048 | 55.72 | (+) |
| 24 | −8.536 | * | 24 | 6.884~4.540~1.500 | 24 | AIR | AIR | LF |
| 25 | ∞ | | 25 | 1.100 | 25 | 1.51680 | 64.20 | |
| 26 | ∞ | | | | | | | |

TABLE 6

Example 3

Aspherical Surface Data
of Surface 2 (i = 2)

| | |
|---|---|
| ε | 1.0000 |
| A4 | −2.63066E−04 |
| A6 | −1.13483E−05 |
| A8 | 8.72668E−08 |
| A10 | −8.79647E−09 |

Aspherical Surface Data
of Surface 21 (i = 21)

| | |
|---|---|
| ε | 1.0000 |
| A4 | −3.39253E−03 |
| A6 | −2.20015E−04 |
| A8 | 2.57265E−06 |

Aspherical Surface Data
of Surface 22 (i = 22)

| | |
|---|---|
| ε | 1.0000 |
| A4 | −1.54924E−03 |
| A6 | −1.15982E−04 |
| A8 | 7.47806E−06 |

Aspherical Surface Data
of Surface 23 (i = 23)

| | |
|---|---|
| ε | 1.0000 |
| A4 | −4.41492E−04 |
| A6 | −2.31289E−06 |
| A8 | −2.53806E−07 |

Aspherical Surface Data
of Surface 24 (i = 24)

| | |
|---|---|
| ε | 1.0000 |
| A4 | −2.48926E−04 |
| A6 | 1.01806E−05 |
| A8 | −3.31874E−07 |

What is claimed is:

1. A variable magnification optical system comprising a plurality of lens groups for imaging light from an object side on an image surface of an image sensor,
wherein the plurality of lens groups includes at least: in order from the object side to an image side,
the first lens group having a negative optical power,
the second lens group having a positive optical power,
the third lens group having a negative optical power, and
the fourth lens group having a positive optical power;
wherein, in a case of magnification variation from a wide angle end to a telephoto end, in an optical axis direction, the third lens group is immobile with respect to the image surface, while at least the second lens group and the fourth lens group move, whereby:
an interval between the first lens group and the second lens group decreases,
an interval between the second lens group and the third lens group increases, and
an interval between the third lens group and the fourth lens group decreases, and on the other hand,
the third lens group moves in an in-surface direction vertical to the optical axis direction to thereby correct shake resulting from imaging on the image surface;
wherein conditional formulae (1) and (2) below are fulfilled:

$$0.7 \leq f2/\sqrt{(fw \times ft)} \leq 1.3 \quad \text{Conditional formula (1),}$$

$$0.4 \leq \beta 3t/\beta 3w \leq 2.2 \quad \text{Conditional formula (2),}$$

where
f2: denotes a focal length of the second lens group;
fw: denotes a focal length of the entire variable magnification optical system at the wide angle end;
ft: denotes a focal length of the entire variable magnification optical system at the telephoto end;
βt: denotes a lateral magnification ratio of the third lens group at the telephoto end; and
βw: denotes a lateral magnification ratio of the third lens group at the wide angle end.

2. The variable magnification optical system according to claim 1,
wherein the first lens group includes an optical axis changing element.

3. The variable magnification optical system according to claim 2,
wherein the first lens group is immobile in the optical axis direction with respect to the image surface.

4. The variable magnification optical system according to claim 1,
wherein the first lens group is immobile in the optical axis direction with respect to the image surface.

5. The variable magnification optical system according to claim 1,
wherein conditional formula (3) below is fulfilled:

$$2.9 \leq ft/fw \leq 3.1 \quad \text{Conditional formula (3),}$$

where
fw: denotes a focal length (in mm) of the entire variable magnification optical system OS at the wide angle end (W); and
ft: denotes a focal length (in mm) of the entire variable magnification optical system OS at the telephoto end (T).

6. The variable magnification optical system according to claim 1,
wherein conditional formula (2)' below is further fulfilled:

$0.8 \leq \beta 3t/\beta 3w \leq 2.0$     Conditional formula (2)'.

7. A variable magnification optical system comprising a plurality of lens groups for imaging light from an object side on an image surface of an image sensor,
wherein the plurality of lens groups includes at least: in order from the object side to an image side,
the first lens group having a negative optical power,
the second lens group having a positive optical power,
the third lens group having a negative optical power, and
the fourth lens group having a positive optical power;
wherein, in a case of magnification variation from a wide angle end to a telephoto end, in an optical axis direction, the third lens group is immobile with respect to the image surface, while at least the second lens group and the fourth lens group move, whereby:
an interval between the first lens group and the second lens group decreases,
an interval between the second lens group and the third lens group increases, and
an interval between the third lens group and the fourth lens group decreases, and on the other hand,
the third lens group moves in an in-surface direction vertical to the optical axis direction to thereby correct shake resulting from imaging on the image surface;
wherein the third lens group has an optical aperture stop at position on a most image side and at least one lens element at a different position,
wherein, when the third lens group moves in the in-surface direction vertical to the optical axis direction to correct shake resulting from imaging, the optical aperture stop is immobile while the lens element inside the third lens group moves; and
wherein conditional formula (1) below is fulfilled:

$0.7 \leq f2/\sqrt{(fw \times ft)} \leq 1.3$     Conditional formula (1), where
f2: denotes a focal length of the second lens group;
fw: denotes a focal length of the entire variable magnification optical system at the wide angle end; and
ft: denotes a focal length of the entire variable magnification optical system at the telephoto end.

8. The variable magnification optical system according to claim 7,
wherein the first lens group includes an optical axis changing element.

9. The variable magnification optical system according to claim 8,
wherein the first lens group is immobile in the optical axis direction with respect to the image surface, and
wherein conditional formula (2) below is fulfilled:

$0.4 \leq \beta 3t/\beta 3w \leq 2.2$     Conditional formula (2), where
βt: denotes a lateral magnification ratio of the third lens group at the telephoto end; and
βw: denotes a lateral magnification ratio of the third lens group at the wide angle end.

10. The variable magnification optical system according to claim 7,
wherein the first lens group is immobile in the optical axis direction with respect to the image surface.

11. The variable magnification optical system according to claim 7,
wherein conditional formula (3) below is fulfilled:

$2.9 \leq ft/fw \leq 3.1$     Conditional formula (3), where
fw: denotes a focal length (in mm) of the entire variable magnification optical system OS at the wide angle end (W); and
ft: denotes a focal length (in mm) of the entire variable magnification optical system OS at the telephoto end (T).

12. A variable magnification optical system comprising a plurality of lens groups for imaging light from an object side on an image surface of an image sensor,
wherein the plurality of lens groups includes at least: in order from the object side to an image side,
the first lens group having a negative optical power,
the second lens group having a positive optical power,
the third lens group having a negative optical power, and
the fourth lens group having a positive optical power;
wherein, in a case of magnification variation from a wide angle end to a telephoto end, in an optical axis direction, the third lens group is immobile with respect to the image surface, while at least the second lens group and the fourth lens group move, whereby:
an interval between the first lens group and the second lens group decreases,
an interval between the second lens group and the third lens group increases, and
an interval between the third lens group and the fourth lens group decreases, and on the other hand,
the third lens group moves in an in-surface direction vertical to the optical axis direction to thereby correct shake resulting from imaging on the image surface;
wherein the second lens group and the fourth lens group move in a coupled manner; and
wherein conditional formula (1) below is fulfilled:

$0.7 \leq f2/\sqrt{(fw \times ft)} \leq 1.3$     Conditional formula (1), where
f2: denotes a focal length of the second lens group;
fw: denotes a focal length of the entire variable magnification optical system at the wide angle end; and
ft: denotes a focal length of the entire variable magnification optical system at the telephoto end.

13. A variable magnification optical system comprising a plurality of lens groups for imaging light from an object side on an image surface of an image sensor,
wherein the plurality of lens groups includes at least: in order from the object side to an image side,
the first lens group having a negative optical power,
the second lens group having a positive optical power,
the third lens group having a negative optical power, and
the fourth lens group having a positive optical power;
wherein, in a case of magnification variation from a wide angle end to a telephoto end, in an optical axis direction, the third lens group is immobile with respect to the image surface, while at least the second lens group and the fourth lens group move, whereby:

an interval between the first lens group and the second lens group decreases, an interval between the second lens group and the third lens group increases, and an interval between the third lens group and the fourth lens group decreases, and on the other hand, the third lens group moves in an in-surface direction vertical to the optical axis direction to thereby correct shake resulting from imaging on the image surface;

wherein a fifth lens group having a negative optical power is included on an image side of the fourth lens group; and wherein conditional formula (1) below is fulfilled:

$$0.7 \leq f2/\sqrt{(fw \times ft)} \leq 1.3 \quad \text{Conditional formula (1),}$$

where f2: denotes a focal length of the second lens group;

fw: denotes a focal length of the entire variable magnification optical system at the wide angle end; and ft: denotes a focal length of the entire variable magnification optical system at the telephoto end.

14. A variable magnification optical system comprising a plurality of lens groups for imaging light from an object side on an image surface of an image sensor, wherein the plurality of lens groups includes at least: in order from the object side to an image side, the first lens group having a negative optical power, the second lens group having a positive optical power, the third lens group having a negative optical power, and the fourth lens group having a positive optical power;

wherein, in a case of magnification variation from a wide angle end to a telephoto end, in an optical axis direction, the third lens group is immobile with respect to the image surface, while at least the second lens group and the fourth lens group move, whereby:

an interval between the first lens group and the second lens group decreases, an interval between the second lens group and the third lens group increases, and an interval between the third lens group and the fourth lens group decreases, and on the other hand, the third lens group moves in an in-surface direction vertical to the optical axis direction to thereby correct shake resulting from imaging on the image surface;

wherein a fifth lens group having a positive optical power is included on an image side of the fourth lens group; and wherein conditional formula (1) below is fulfilled:

$$0.7 \leq f2/\sqrt{(fw \times ft)} \leq 1.3 \quad \text{Conditional formula (1),}$$

where f2: denotes a focal length of the second lens group;

fw: denotes a focal length of the entire variable magnification optical system at the wide angle end; and ft: denotes a focal length of the entire variable magnification optical system at the telephoto end.

15. A variable magnification optical system comprising a plurality of lens groups for imaging light from an object side on an image surface of an image sensor, wherein the plurality of lens groups comprises four lens groups including: in order from the object side to an image side, the first lens group having a negative optical power, the second lens group having a positive optical power, the third lens group having a negative optical power, and the fourth lens group having a positive optical power;

wherein, in a case of magnification variation from a wide angle end to a telephoto end, in an optical axis direction, the third lens group is immobile with respect to the image surface, while at least the second lens group and the fourth lens group move, whereby:

an interval between the first lens group and the second lens group decreases, an interval between the second lens group and the third lens group increases, and an interval between the third lens group and the fourth lens group decreases, and on the other hand, the third lens group moves in an in-surface direction vertical to the optical axis direction to thereby correct shake resulting from imaging on the image surface;

wherein conditional formulae (1) and (2) below are fulfilled:

$$0.7 \leq f2/\sqrt{(fw \times ft)} \leq 1.3 \quad \text{Conditional formula (1),}$$

$$0.4 \leq \beta 3t/\beta 3w \leq 2.2 \quad \text{Conditional formula (2),}$$

where f2: denotes a focal length of the second lens group;

fw: denotes a focal length of the entire variable magnification optical system at the wide angle end;

ft: denotes a focal length of the entire variable magnification optical system at the telephoto end;

$\beta t$: denotes a lateral magnification ratio of the third lens group at the telephoto end; and $\beta w$: denotes a lateral magnification ratio of the third lens group at the wide angle end.

16. The variable magnification optical system according to claim 15, wherein the first lens group includes an optical axis changing element.

17. The variable magnification optical system according to claim 15, wherein the first lens group is immobile in the optical axis direction with respect to the image surface.

* * * * *